(12) United States Patent
Miyagoe et al.

(10) Patent No.: US 11,609,360 B2
(45) Date of Patent: Mar. 21, 2023

(54) LAMINATE, METHOD FOR MANUFACTURING ELECTRONIC DEVICE, AND METHOD FOR MANUFACTURING LAMINATE

(71) Applicant: AGC INC., Chiyoda-ku (JP)

(72) Inventors: Tatsuzo Miyagoe, Tokyo (JP); Teruo Fujiwara, Tokyo (JP)

(73) Assignee: AGC INC., Chiyoda-ku (JP)

(*) Notice: Subject to any disclaimer, the term of this patent is extended or adjusted under 35 U.S.C. 154(b) by 854 days.

(21) Appl. No.: 16/276,778

(22) Filed: Feb. 15, 2019

(65) Prior Publication Data

US 2019/0176433 A1 Jun. 13, 2019

Related U.S. Application Data

(63) Continuation of application No. PCT/JP2017/029390, filed on Aug. 15, 2017.

(30) Foreign Application Priority Data

Aug. 18, 2016 (JP) .............................. JP2016-160802

(51) Int. Cl.
*B32B 7/12* (2006.01)
*G02B 1/115* (2015.01)
(Continued)

(52) U.S. Cl.
CPC ................ *G02B 1/115* (2013.01); *B32B 7/12* (2013.01); *B32B 9/00* (2013.01);
(Continued)

(58) Field of Classification Search
CPC .......... G02B 1/113–116; C03C 2217/73–734; B32B 7/06; B32B 37/025; B32B 2307/748
See application file for complete search history.

(56) References Cited

U.S. PATENT DOCUMENTS

| 6,611,090 B1* | 8/2003 | Ishikawa ................ G02B 1/116 313/461 |
| 2004/0005436 A1* | 1/2004 | Mori ........................ G02B 1/11 428/141 |

(Continued)

FOREIGN PATENT DOCUMENTS

| CN | 104349894 A | 2/2015 |
| CN | 104755967 A | 7/2015 |

(Continued)

OTHER PUBLICATIONS

Machine translation of JP 2007/328284 A, obtained from J-Platpat of the JPO. (Year: 2022).*

(Continued)

*Primary Examiner* — Z. Jim Yang
(74) *Attorney, Agent, or Firm* — Oblon, McClelland, Maier & Neustadt, L.L.P.

(57) ABSTRACT

The present invention provides a laminate that can eliminate adsorption defects of a substrate caused by warping of the substrate and enables electronic devices to be manufactured at high yield. The present invention pertains to a laminate that is provided with a support base material, an adhesion layer, and a substrate in said order. The substrate is provided with a dielectric multilayer film in which dielectric layers having different refractive indexes are alternately laminated on an outer surface of the substrate. The substrate provided with the dielectric multilayer film is disposed on the adhesion layer such that the dielectric multilayer film adheres in a peelable manner to the adhesion layer.

18 Claims, 2 Drawing Sheets

(51) Int. Cl.
*B32B 9/00* (2006.01)
*B32B 17/10* (2006.01)
*C03C 17/34* (2006.01)
*G02B 1/11* (2015.01)

(52) U.S. Cl.
CPC ............ *B32B 17/10165* (2013.01); *B32B 17/10201* (2013.01); *B32B 17/10798* (2013.01); *C03C 17/3417* (2013.01); *G02B 1/11* (2013.01); *B32B 2457/202* (2013.01); *C03C 2217/213* (2013.01); *C03C 2217/218* (2013.01); *C03C 2217/734* (2013.01); *C03C 2218/154* (2013.01)

(56) References Cited

U.S. PATENT DOCUMENTS

| | | | |
|---|---|---|---|
| 2005/0018302 A1 | 1/2005 | Yano et al. | |
| 2005/0249941 A1* | 11/2005 | Iijima | G02B 1/11 428/411.1 |
| 2007/0201128 A1* | 8/2007 | Mitsuhashi | G02B 1/11 359/350 |
| 2008/0297021 A1* | 12/2008 | Hwang | H01J 11/10 445/24 |
| 2010/0142035 A1* | 6/2010 | Yeo | G02B 7/006 427/64 |
| 2010/0230615 A1* | 9/2010 | MacPherson | B42D 25/29 359/290 |
| 2011/0010994 A1* | 1/2011 | Wilson | B32B 7/06 49/506 |
| 2011/0116162 A1* | 5/2011 | Tsujimura | H04N 5/22521 359/359 |
| 2014/0055857 A1* | 2/2014 | Krasnov | G02B 5/0858 204/192.27 |
| 2014/0192286 A1* | 7/2014 | Tasaka | G02B 5/208 349/185 |
| 2015/0002936 A1* | 1/2015 | Jun | G02F 1/133512 359/492.01 |
| 2015/0086794 A1* | 3/2015 | Akita | B32B 17/06 156/247 |
| 2015/0226881 A1 | 8/2015 | Takahashi et al. | |
| 2015/0251393 A1* | 9/2015 | Kanna | B32B 27/08 156/247 |
| 2016/0357290 A1* | 12/2016 | Kanna | B32B 37/00 |
| 2017/0017023 A1 | 1/2017 | Sugiyama et al. | |
| 2017/0239919 A1 | 8/2017 | Miyagoe et al. | |
| 2018/0081087 A1* | 3/2018 | Toyooka | B32B 27/36 |
| 2018/0335548 A1* | 11/2018 | Seder | B08B 7/00 |
| 2019/0160767 A1* | 5/2019 | Kajiya | C09J 5/00 |
| 2020/0026117 A1* | 1/2020 | Teramoto | G09G 3/20 |
| 2020/0278772 A1* | 9/2020 | Toyooka | B32B 37/025 |
| 2021/0098747 A1* | 4/2021 | Kishimoto | H01L 51/56 |
| 2021/0364682 A1* | 11/2021 | Ambur | G02B 1/14 |

FOREIGN PATENT DOCUMENTS

| | | | | |
|---|---|---|---|---|
| DE | 102016015021 A1 * | 6/2017 | | B32B 17/00 |
| JP | 9-219356 A | 8/1997 | | |
| JP | 2003-7499 A | 1/2003 | | |
| JP | 2004050734 A * | 2/2004 | | |
| JP | 2005-43755 | 2/2005 | | |
| JP | 2005-189724 A | 7/2005 | | |
| JP | 2005189724 A * | 7/2005 | | |
| JP | 2007-328284 | 12/2007 | | |
| JP | 2010-40662 A | 2/2010 | | |
| JP | 2011-131149 A | 7/2011 | | |
| JP | 2013-22731 | 2/2013 | | |
| JP | 2014-51404 | 3/2014 | | |
| JP | 2015-012069 | 1/2015 | | |
| JP | 2015-182393 | 10/2015 | | |
| JP | 2016-142891 A | 8/2016 | | |
| JP | 2017109447 A * | 6/2017 | | B32B 17/00 |
| WO | WO 2012-144499 A1 | 10/2012 | | |
| WO | WO 2016/080312 A1 | 5/2016 | | |
| WO | WO 2016/104450 A1 | 6/2016 | | |
| WO | WO 2016/114362 A1 | 7/2016 | | |
| WO | WO-2016204034 A1 * | 12/2016 | | A47L 25/005 |

OTHER PUBLICATIONS

International Search Report dated Nov. 21, 2017 in PCT/JP2017/029390 filed Aug. 15, 2017 (with English Translation).
Written Opinion dated Nov. 21, 2017 in PCT/JP2017/029390 filed Aug. 15, 2017.

* cited by examiner

LAMINATE, METHOD FOR MANUFACTURING ELECTRONIC DEVICE, AND METHOD FOR MANUFACTURING LAMINATE

TECHNICAL FIELD

The present invention relates to a laminate, a method for manufacturing an electronic device, and a method for manufacturing a laminate.

BACKGROUND ART

In recent years, various devices such as liquid crystal display (LCD) panels, organic EL display (OLED) panels and photovoltaic cells (PV) are becoming thinner and lighter, and substrates used for these devices are being made to be thinner.

For example, in a device used for an optical application transmitting light ranging from near ultraviolet light to near infrared light, a glass substrate is preferably used as a substrate. Particularly a glass substrate with an attached dielectric multilayer film is preferably used in order to change characteristics with respect to various kinds of lights. When the composition of the glass substrate is tuned, the linear expansion coefficient of the glass substrate can be controlled precisely. Thus, the glass substrate can be preferably used in a case where a variation in linear expansion coefficient among members causes deterioration in reliability of an element during temperature change or causes a problem in a series of processes for manufacturing the element.

On the other hand, when a dielectric multilayer film such as an antireflection film or a band pass filter is disposed on a glass substrate as described above, the glass substrate where the dielectric multilayer film is disposed may be warped due to stress of the dielectric multilayer film. Particularly now that the glass substrate is made thinner as described above, the amount of the warp is increased.

In addition to the warp caused by the dielectric multilayer film, there are a warp caused by internal stress generated in the glass substrate which is being formed, a warp caused by a difference in composition between a front surface and a back surface, and a warp caused by stress control of chemical strengthening or the like.

Although description has been made about the case where the glass substrate is used as the substrate, thin metal foil (such as copper foil) may be used as a substrate included in various elements. When such thin metal foil is used, the metal foil itself may be warped in the same manner as the aforementioned glass substrate.

Also when a semiconductor substrate is used as the substrate, it may be warped. This warpage may cause a problem in various steps of a semiconductor process.

In the background art, there has been proposed a method for suppressing such a warp of a substrate such as a glass substrate. For example, Patent Literature 1 proposes a method in which a dielectric single layer film is disposed on a surface of a substrate opposite to a surface where a dielectric multilayer film is disposed.

In addition, there has been proposed a method for correcting a warp of a glass substrate. Patent Literature 2 proposes a method in which a glass piece is flattened by its own weight in a continuous annealing furnace, and a method in which the glass piece is annealed in a state where a weight is placed thereon.

CITATION LIST

Patent Literature

Patent Literature 1: JP-A-2005-43755
Patent Literature 2: JP-A-2014-51404

SUMMARY OF INVENTION

Technical Problem

However, according to the method of Patent Literature 1, it takes much time and labor to additionally produce the dielectric single layer film on the other surface of the substrate, causing a large load on the process. In some kind of member for an electronic device to be formed on the substrate, it may be difficult to form the dielectric single layer film on the other surface of the substrate. Also in the method of Patent Literature 2, the load on the process is large.

In a typical process for forming a member for an electronic device on a substrate, a method for fixing the substrate by adsorption is used for fixing the substrate. However, when the member for an electronic device is to be formed on the substrate with a large warp as described above, it may be difficult to adsorb the substrate in the process for forming the member for an electronic device. As a result, the manufacturing yield of the electronic device deteriorates.

It is therefore desired to stably adsorb and fix the substrate in an easier and simpler procedure.

The present invention has been developed in consideration of the aforementioned problems. An object of the present invention is to provide a laminate in which a problem of adsorption failure in a substrate due to a warp of the substrate can be eliminated so that an electronic device can be manufactured with a good yield.

In addition, another object of the present invention is to provide a method for manufacturing an electronic device using the laminate, and a method for producing the laminate.

Solution to Problem

As a result of earnest investigation performed in order to solve the aforementioned problems, the present inventors found that the aforementioned problems can be solved by the following configurations.

A laminate according to the present invention includes:
a support base material, an adhesive layer and a substrate that are provided in this order, in which:
the substrate has a dielectric multilayer film on a surface thereof on the adhesive layer side, in which the dielectric multilayer film includes two or more kinds of dielectric layers, each of the dielectric multilayers has different refractive index and the dielectric multilayers are laminated alternately; and
the substrate having the dielectric multilayer film is disposed on the adhesive layer so that the dielectric multilayer film can peelably adhere to the adhesive layer.

In addition, another laminate according to the present invention includes:
a support base material, an adhesive layer and a substrate that are provided in this order, in which:
the substrate is disposed on the adhesive layer so as to peelably adhere to the adhesive layer; and
the substrate before being disposed on the adhesive layer has an SORI of 130 μm or more.

In the laminate according to one embodiment of the present invention, the outermost dielectric layer of the dielectric multilayer film is a film containing Si atoms.

In the laminate according to one embodiment of the present invention, the outermost dielectric layer of the dielectric multilayer film is $SiO_2$.

In the laminate according to one embodiment of the present invention, the dielectric multilayer film is an antireflection film.

In the laminate according to one embodiment of the present invention, the dielectric multilayer film has a thickness of 0.001 µm to 5 µm.

In the laminate according to one embodiment of the present invention, the dielectric multilayer film is disposed on the surface of the substrate so that a peripheral region where the dielectric multilayer film is not disposed can be left on the surface of the substrate, and the peripheral region includes a region having a width of in a range of 0.1 mm to 20 mm.

In the laminate according to one embodiment of the present invention, the dielectric multilayer film is disposed on the surface of the substrate so that a peripheral region where the dielectric multilayer film is not disposed can be left on the surface of the substrate, and the peripheral region includes a region having a width of in a range of 0.01 mm or less.

In the laminate according to one embodiment of the present invention, a surface of the substrate in contact with the adhesive layer is coated with a film containing Si atoms.

In the laminate according to one embodiment of the present invention, the film containing Si atoms is a deposited film of silicon oxide, a sputtered film of silicon oxide, or a silicone resin film.

In the laminate according to one embodiment of the present invention, the adhesive layer is a layer containing a silicone resin.

In the laminate according to one embodiment of the present invention, an area of a main surface of the substrate is 300 cm² or more.

The laminate according to one embodiment of the present invention has an SORI of 20 µm to 120 µm.

In the laminate according to one embodiment of the present invention, the substrate is a glass substrate.

Further, a method for manufacturing an electronic device according to the present invention includes:

a member-forming step of forming a member for an electronic device on a surface of the substrate of the laminate according to one embodiment of the present invention opposite to the adhesive layer, so as to obtain a laminate with an attached member for an electronic device; and a separation step of removing the support base material and the adhesive layer from the laminate with an attached member for an electronic device, so as to obtain an electronic device including the substrate with an attached dielectric multilayer film and the member for an electronic device.

In addition, another method for manufacturing an electronic device according to the present invention includes:

a member-forming step of forming a member for an electronic device on a surface of the substrate of the laminate according to one embodiment of the present invention opposite to the adhesive layer, so as to obtain a laminate with an attached member for an electronic device; and a separation step of removing the support base material and the adhesive layer from the laminate with an attached member for an electronic device, so as to obtain an electronic device including the substrate and the member for an electronic device.

In the method for manufacturing an electronic device according to one embodiment of the present invention, the substrate is a glass substrate.

A method for manufacturing the laminate according to one embodiment of the present invention includes steps of:

applying at least one surface treatment selected from the group consisting of a corona treatment, an atmospheric plasma treatment and a UV ozone treatment to an outermost dielectric layer of a dielectric multilayer film in a substrate with an attached dielectric multilayer film including a substrate and the dielectric multilayer film disposed on the substrate; and laminating a support base material with an attached adhesive layer including a support base material and an adhesive layer disposed on the support base material, and the substrate with an attached dielectric multilayer film subjected to the surface treatment.

A method for manufacturing the laminate according to one embodiment of the present invention includes steps of:

applying at least one surface treatment selected from the group consisting of a corona treatment, an atmospheric plasma treatment and a UV ozone treatment to a film containing Si atoms, with which a substrate is coated; and laminating a support base material with an attached adhesive layer including a support base material and an adhesive layer disposed on the support base material, and the substrate coated with the film containing Si atoms subjected to the surface treatment.

Advantageous Effects of Invention

According to the present invention, it is possible to provide a laminate in which a problem of adsorption failure in a substrate due to a warp of the substrate can be eliminated so that an electronic device can be manufactured with a good yield.

In addition, according to the present invention, it is possible to provide a method for manufacturing an electronic device using the laminate, and a method for manufacturing the laminate.

DESCRIPTION OF EMBODIMENTS

Embodiments for carrying out the present invention will be described below with reference to the drawings. However, the present invention is not limited to the following embodiments, but various modifications and replacements can be made on the following embodiments without departing from the scope of the present invention.

In addition, in the present description, percentages (mass %) based on mass are synonymous with percentages (weight %) based on weight. Further, the simple expression of "ppm" represents "mass ppm".

First Embodiment

A first embodiment of a laminate according to the present invention is a glass laminate including a support base material, an adhesive layer and a substrate that are provided in this order. In the glass laminate, the substrate has a dielectric multilayer film on a surface of the substrate. The dielectric multilayer film includes dielectric layers, and each of the dielectric multilayers has different refractive index and the dielectric multilayers are laminated alternately. The substrate having the dielectric multilayer film is disposed on the adhesive layer so that the dielectric multilayer film can peelably adhere to the adhesive layer (hereinafter the substrate will be also referred to as "substrate with an attached dielectric multilayer film").

In the glass laminate, in which the substrate with an attached dielectric multilayer film is disposed on the adhesive layer so as to adhere thereto, the substrate with an attached dielectric multilayer film follows a flat surface in the surface of the adhesive layer so as to eliminate a warp belonging to the substrate with an attached dielectric multilayer film itself. Therefore, an adsorption failure of the substrate occurring when an electronic device is produced using the substrate alone can be eliminated. After a member for an electronic device is disposed on the substrate, the substrate with an attached dielectric multilayer film where the member for an electronic device has been disposed can be peeled at the interface between the substrate with an attached dielectric multilayer film and the adhesive layer. Thus, a desired electronic device can be obtained.

Figure 1:
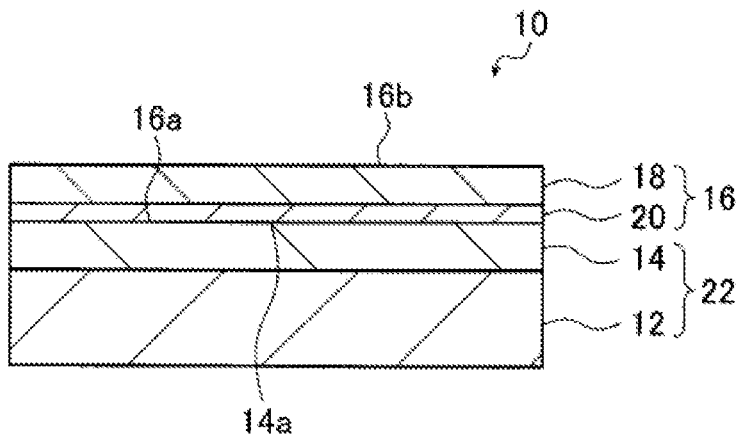
FIG. 1 is a schematic cross-sectional view of a first embodiment of a glass laminate according to the present invention.

FIG. 1 is a schematic cross-sectional view of the first embodiment of the glass laminate according to the present invention.

As illustrated in FIG. 1, a glass laminate 10 is a laminate which includes a support base material 12, a substrate 16 with an attached dielectric multilayer film, and an adhesive layer 14 present therebetween. The substrate 16 with an attached dielectric multilayer film has a glass substrate 18, and a dielectric multilayer film 20 disposed on the glass substrate 18.

One surface of the adhesive layer 14 is in contact with the support base material 12 and the other surface thereof is in contact with a first main surface 16a (a surface on the dielectric multilayer film 20 side) of the substrate 16 with an attached dielectric multilayer film.

The two-layer portion formed of the support base material 12 and the adhesive layer 14 reinforces the substrate 16 with an attached dielectric multilayer film in a member-forming step of manufacturing a member for an electronic device such as a liquid crystal panel. The two-layer portion formed of the support base material 12 and the adhesive layer 14 is manufactured in advance for manufacturing the glass laminate 10, and will be referred to as a support base material 22 with an attached adhesive layer.

The glass laminate 10 is used up to a member-forming step which will be described later. That is, the glass laminate 10 is used until a member for an electronic device is formed on a second main surface 16b (a surface on the glass substrate 18 side) of the substrate 16 with an attached dielectric multilayer film. Thereafter, the glass laminate on which the member for an electronic device has been formed is separated into a support base material 22 with an attached adhesive layer and an electronic device (a glass substrate with an attached member), and the support base material 22 with an attached adhesive layer is not a portion constituting the electronic device. A new substrate 16 with an attached dielectric multilayer film is laminated on the support base material 22 with an attached adhesive layer, and the resultant is able to be reused as a new glass laminate 10.

The adhesive layer 14 is fixed on the support base material 12, and the substrate 16 with an attached dielectric multilayer film peelably adheres to (is laminated on) the adhesive layer 14. In the present invention, the fixation and the peelable adhesion (lamination) differ in peel strength (that is, stress required for peeling), and the fixation means that the peel strength is larger than that in the adhesion. In other words, the peel strength at the interface between the adhesive layer 14 and the support base material 12 is larger than the peel strength at the interface between the adhesive layer 14 and the substrate 16 with an attached dielectric multilayer film. That is to say that the peelable adhesion (lamination) means that peeling is possible and also that the peeling is possible without causing any peeling at the fixed surface.

More specifically, the interface between the support base material 12 and the adhesive layer 14 has a peel strength (x) and when stress is applied in the peeling direction exceeding the peel strength (x) to the interface between the support base material 12 and the adhesive layer 14, the support base material 12 and the adhesive layer 14 are peeled off. On the other hand, the interface between the adhesive layer 14 and the substrate 16 with an attached dielectric multilayer film has a peel strength (y) and when stress is applied in the peeling direction exceeding the peel strength (y) to the interface between the adhesive layer 14 and the substrate 16 with an attached dielectric multilayer film, the adhesive layer 14 and the substrate 16 with an attached dielectric multilayer film are peeled off.

In the glass laminate 10 (also meaning a laminate with an attached member for an electronic device described below), the peel strength (x) is larger than the peel strength (y). Accordingly, when a stress is applied to the glass laminate 10 in the direction for peeling off the support base material 12 and the substrate 16 with an attached dielectric multilayer film, the glass laminate 10 according to the present invention is peeled at the interface between the adhesive layer 14 and the substrate 16 with an attached dielectric multilayer film, and separates into the substrate 16 with an attached dielectric multilayer film and the support base material 22 with an attached adhesive layer.

The peel strength (x) is preferably sufficiently higher than the peel strength (y).

A method for increasing the attachment force of the adhesive layer 14 with respect to the support base material 12 is not limited particularly, but it may be achieved by, for example, as described below, a method in which a curable resin containing predetermined components is cured (crosslinked and cured) on the support base material 12 to form the adhesive layer 14. It is possible to form the adhesive layer 14 bonded to the support base material 12 with a high bonding force by the adhesion force generated at the time of curing.

Meanwhile, the bonding force of the adhesive layer 14 with respect to the substrate 16 with an attached dielectric multilayer film is usually lower than the aforementioned bonding force generated at the time of curing. Accordingly, the glass laminate 10 satisfying the desired peeling relationship can be manufactured in such a manner that curing treatment (heating treatment) is applied to a layer of curable resin to thereby form the adhesive layer 14 on the support base material 12 and the substrate 16 with an attached dielectric multilayer film is then laminated on the surface of the adhesive layer 14.

A detailed description will be given below of each layer (the support base material 12, the adhesive layer 14 and the substrate 16 with an attached dielectric multilayer film) constituting the glass laminate 10, and then a detailed description will be given of a method for manufacturing a glass laminate and an electronic device.

<Support Base Material>

The support base material 12 supports and reinforces the substrate 16 with an attached dielectric multilayer film, and prevents deformation, damage, breakage, or the like of the substrate 16 with an attached dielectric multilayer film, particularly damage on the dielectric multilayer film when manufacturing a member for an electronic device in a member-forming step (a step of manufacturing a member for an electronic device) described below.

The glass substrate which has been thinned is short of strength, causing deterioration in handling property of the glass substrate itself. However, due to adhesion between the support base material and the adhesive layer, and the glass substrate, the aforementioned deterioration in the handling property can be eliminated.

As the support base material 12, for example, a glass sheet, a plastic sheet, a metal sheet (such as a SUS (stainless steel) sheet), or the like is used. Generally, since the member-forming step involves a heat treatment, the support base material 12 is preferably formed of a material having a small difference in linear expansion coefficient with respect to the glass substrate 18, and is more preferably formed of the same material as the glass substrate 18. The support base material 12 is preferably a glass sheet. In particular, the support base material 12 is preferably a glass sheet formed of the same glass material as the glass substrate 18.

The thickness of the support base material 12 may be thicker than or may be thinner than that of the substrate 16 with an attached dielectric multilayer film.

The thickness of the support base material 12 is preferably selected based on the thickness of the substrate 16 with an attached dielectric multilayer film, the thickness of the adhesive layer 14, and the thickness of the glass laminate 10. For example, in a case where the current member-forming step is designed to process a substrate having a thickness of 0.5 mm and the sum of the thickness of the substrate 16 with an attached dielectric multilayer film and the thickness of the adhesive layer 14 is 0.1 mm, the thickness of the support base material 12 is set to 0.4 mm. In a usual case, the thickness of the support base material 12 is preferably 0.1 to 5.0 mm.

In order to stably reduce the warp of the substrate 16 with an attached dielectric multilayer film, it is preferable that the support base material 12 has a less warp and a higher rigidity from the viewpoint of controlling the warp of the glass laminate 10. When the substrate in the substrate 16 with an attached dielectric multilayer film is made of the same material as the support base material 12, the support base material 12 may have a warp shape that is surface-symmetric to the substrate in the substrate 16 with an attached dielectric multilayer film.

In a case where the support base material 12 is a glass sheet, the thickness of the glass sheet is preferably 0.03 mm or more for reasons such as ease of handling and resistance to cracking. In addition, the thickness of the glass sheet is preferably 1.0 mm or less for the reason that rigidity is desired such that the sheet bends appropriately without breaking when carrying out the peeling after forming the member for an electronic device.

The difference in the average linear expansion coefficient between the support base material 12 and the glass substrate 18 at 25 to 300° C. is preferably $10\times10^{-7}/°$ C. or less, more preferably $3\times10^{-7}/°$ C. or less, and even more preferably $1\times10^{-7}/°$ C. or less. If the difference is excessively large, there is a possibility that the glass laminate 10 will warp excessively or the support base material 12 and the substrate 16 with an attached dielectric multilayer film will peel apart in heating and cooling in the member-forming step. In a case where the material of the support base material 12 is the same as the material of the glass substrate 18, it is possible to suppress the occurrence of such warping or peeling.

<Adhesive Layer 14>

The adhesive layer 14 plays a roll of eliminating an adsorption failure caused by the warp of the substrate 16 with an attached dielectric multilayer film until the operation of separating the support base material 12 and the substrate 16 with an attached dielectric multilayer film, and prevents the substrate 16 with an attached dielectric multilayer film or the like from being damaged by the separation operation. The surface 14a of the adhesive layer 14 in contact with the substrate 16 with an attached dielectric multilayer film peelably adheres to (is laminated on) the first main surface 16a of the substrate 16 with an attached dielectric multilayer film. As described previously, the adhesive layer 14 is bonded to the first main surface 16a of the substrate 16 with an attached dielectric multilayer film with a weak bonding force, and the peel strength (y) at the interface between the both is smaller than the peel strength (x) at the interface between the adhesive layer 14 and the support base material 12.

That is, at the time of separating the substrate 16 with an attached dielectric multilayer film and the support base material 12, peeling occurs at the interface between the substrate 16 with an attached dielectric multilayer film and the adhesive layer 14 and peeling does not easily occur at the interface between the support base material 12 and the adhesive layer 14. Therefore, although the adhesive layer 14 adheres to the first main surface 16a of the substrate 16 with an attached dielectric multilayer film, it has surface characteristics allowing easy peeling off the substrate 16 with an attached dielectric multilayer film. That is, the adhesive layer 14 is bonded to the first main surface 16a of the substrate 16 with an attached dielectric multilayer film with a some extent of bonding force so as to prevent an adsorption failure caused by the warp of the substrate 16 with an attached dielectric multilayer film and, at the same time, is bonded with a bonding force such that it is possible to easily carry out the peeling without breaking the substrate 16 with an attached dielectric multilayer film when peeling off the substrate 16 with an attached dielectric multilayer film. In the present invention, the property of allowing easy peeling in the surface of the adhesive layer 14 is referred to as peelability. Meanwhile, the first main surface of the support base material 12 and the adhesive layer 14 are bonded with a bonding force such that peeling is relatively difficult.

The type of the adhesive layer 14 is not particularly limited, and it may be an organic layer formed of a resin or the like, or may be an inorganic layer. Each case will be described below in detail.

(Organic Layer)

The organic layer is preferably a resin layer including a predetermined resin. The type of the resin forming the resin layer is not particularly limited, but examples thereof include silicone resins, polyimide resins, acrylic resins, polyolefin resins, polyurethane resins, or fluororesins. It is also possible to mix and use several types of resins. Among these, silicone resins, polyimide resins, and fluororesins are preferred.

The silicone resins are resins containing predetermined units of organopolysiloxane and can be typically obtained by curing curable silicone. The curable silicones are classified into addition reaction type silicones, condensation reaction type silicones, ultraviolet curable type silicones, and electron beam curable type silicones, based on the curing mechanism thereof, and any type can be used. Among them, the addition reaction type silicones or the condensation reaction type silicones are preferred.

A curable composition containing a main agent and a crosslinking agent and cured under existence of a catalyst such as a platinum catalyst can be used suitably as such an addition reaction type silicone. Curing the addition reaction type silicone is promoted by a heating treatment. The main agent in the addition reaction type silicone is preferably organopolysiloxane with an alkynyl group (such as a vinyl group) bonded to a silicon atom (that is, organoalkenylpolysiloxane, preferably a straight-chain one), in which the alkynyl group or the like can serve as a crosslinking point. The crosslinking agent in the addition reaction type silicone is preferably organopolysiloxane with a hydrogen atom (hydrosilyl group) bonded to a silicon atom (that is, organohydrogenpolysiloxane, preferably a straight-chain one), in which the hydrosilyl group or the like can serve as a crosslinking point.

The addition reaction type silicon is cured by addition reaction of crosslinking points in the main agent and the crosslinking agent. The molar ratio of the hydrogen atom bonded to silicon atom in the organohydrogenpolysiloxane to the alkenyl group of the organoalkenylpolysiloxane is preferably 0.5 to 2 in terms of more excellent heat resistance due to a crosslinking structure.

In a case where the addition reaction type silicone is used, a catalyst (particularly a platinum group metal-based catalyst) may be further used if necessary.

The platinum group metal-based catalyst (platinum group metal catalyst for hydrosilylation) is a catalyst for advancing and promoting a hydrosilylation reaction between the alkenyl group in the organoalkenylpolysiloxane and the hydrogen atom in the organohydrogenpolysiloxane. Examples of the platinum group metal-based catalyst include platinum group-based, palladium group-based, and rhodium group-based catalysts. In particular, it is preferable to use a platinum-based catalyst from the viewpoint of economy and reactivity.

As the condensation reaction type silicones, it is possible to suitably use a hydrolyzable organosilane compound, which is a monomer, or a mixture thereof (monomer mixture), or a partially hydrolyzed condensate (organopolysiloxane) obtained by partially hydrolyzed condensation reaction of the monomer or the monomer mixture.

By use of such a condensation reaction type silicone, hydrolyzation/condensation reaction (sol-gel reaction) can be advanced to form a silicone resin.

The polyimide resins are resins each having an imide structure, and are resin that can be obtained by reaction of tetracarboxylic acids with diamines.

The structure of such a polyimide resin is not limited particularly, but preferably composed of recurring units each having a residue (X) of tetracarboxylic acid and a residue (A) of diamine as expressed in the following formula (1).

[Chem. 1]

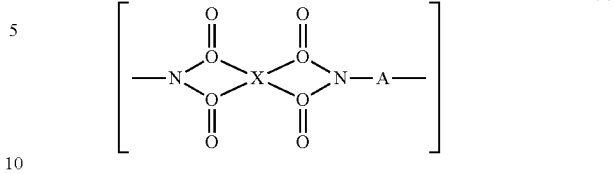

Formula (1)

In the formula (1), X represents a tetracarboxylic acid residue in which the carboxyl group has been removed from a tetracarboxylic acid, and A represents a diamine residue in which the amine group has been removed from a diamine.

Preferably, in the formula (1), X represents a tetracarboxylic acid residue in which the carboxyl group has been removed from a tetracarboxylic acid, and is composed of at least one kind of group selected from the group consisting of groups expressed by the following formulae (X1) to (X4). Among them, in terms of excellent heat resistant polyimide resins, more preferably 50 mol % or more (preferably 80 to 100 mol %) of the total number of X is composed of at least one kind of group selected from the group consisting of groups expressed by the following formulae (X1) to (X4). Even more preferably, substantially all the number (100 mol %) of the total number of X is composed of at least one kind of group selected from the group consisting of groups expressed by the following formulae (X1) to (X4).

On the other hand, A represents a diamine residue in which the amine group has been removed from a diamine, and is preferably composed of at least one kind of group selected from the group consisting of groups expressed by the following formulae (A1) to (A8). Among them, more preferably 50 mol % or more (preferably 80 to 100 mol %) of the total number of A is composed of at least one kind of group selected from the group consisting of groups expressed by the following formulae (A1) to (A8). Even more preferably, substantially all the number (100 mol %) of the total number of A is composed of at least one kind of group selected from the group consisting of groups expressed by the following formulae (A1) to (A8).

[Chem. 2]

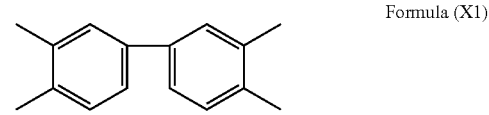

Formula (X1)

Formula (X2)

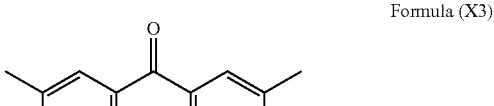

Formula (X3)

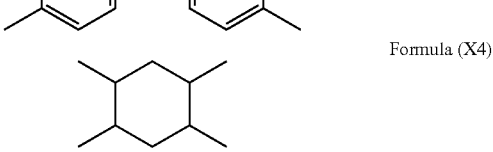

Formula (X4)

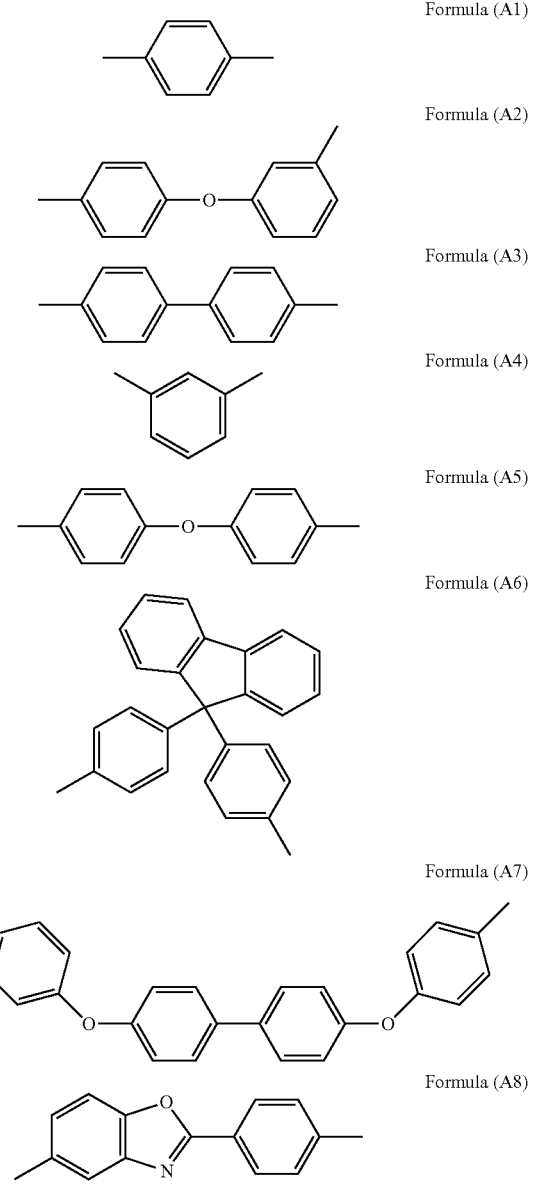

Formula (A1)
Formula (A2)
Formula (A3)
Formula (A4)
Formula (A5)
Formula (A6)
Formula (A7)
Formula (A8)

The thickness of the organic layer is not limited particularly, but it is preferably 1 to 100 μm, more preferably 5 to 30 μm, and even more preferably 7 to 20 μm. When the thickness of the organic layer is within such a range, the adhesion between the organic layer and the substrate with an attached dielectric multilayer film is sufficient.

In addition, a leveling agent may be contained in the organic layer in order to improve the flatness of the organic layer. The type of the leveling agent is not limited particularly, but a fluorine-based leveling agent can be used as a typical one.

(Inorganic Layer)

The materials constituting the inorganic layer are not particularly limited, but it is preferable to include at least one selected from a group consisting of, for example, oxides, nitrides, oxynitrides, carbides, carbonitrides, silicides, and fluorides. In particular, it is preferable to include the oxides in terms of more excellent peelability of the substrate 16 with an attached dielectric multilayer film.

Examples of oxides (preferably metal oxides), nitrides (preferably metal nitrides) and oxynitrides (preferably metal oxynitrides) include oxides, nitrides and oxynitrides of one or more elements selected from, for example, Si, Hf, Zr, Ta, Ti, Y, Nb, Na, Co, Al, Zn, Pb, Mg, Bi, La, Ce, Pr, Sm, Eu, Gd, Dy, Er, Sr, Sn, In and Ba. More specifically, silicon nitride oxide ($SiN_xO_y$), titanium oxide ($TiO_2$), indium oxide ($In_2O_3$), indium cerium oxide (ICO), tin oxide ($SnO_2$), zinc oxide (ZnO), gallium oxide ($Ga_2O_3$), indium tin oxide (ITO), indium zinc oxide (IZO), zinc tin oxide (ZTO), gallium-added zinc oxide (GZO), etc. can be used.

Examples of carbides (preferably metal carbides) and carbonitrides (preferably metal carbonitrides) include carbides, carbonitrides and carbonates of one or more elements selected from Ti, W, Si, Zr and Nb. For example, silicon carbide oxide (SiCO) can be used.

The carbides may be so-called carbon materials. For example, the carbides may be ones obtained by sintering a resin component such as a phenol resin.

Examples of silicides (preferably metal silicides) include silicides of one or more elements selected from Mo, W, and Cr.

Examples of fluorides (preferably metal fluorides) include fluorides of one or more elements selected from Mg, Y, La and Ba. For example, magnesium fluoride ($MgF_2$) can be used.

The thickness of the inorganic layer is not limited particularly, but it is preferably 5 to 5,000 nm and more preferably 10 to 500 nm in terms of more excellent effects of the present invention.

Surface roughness (Ra) of a surface of the inorganic layer in contact with the substrate 16 with an attached dielectric multilayer film is preferably 2.0 nm or less, and more preferably 1.0 nm or less. The lower limit thereof is not limited particularly, but it is most preferably 0. Within the aforementioned range, the adhesion to the substrate 16 with an attached dielectric multilayer film is more improved so that the adsorption failure or the like caused by use of the substrate 16 with an attached dielectric multilayer film alone can be more suppressed while peelability of the substrate 16 with an attached dielectric multilayer film is also excellent.

Ra is measured according to JIS B 0601 (revised in 2001).

The adhesive layer 14 may be a plasma polymerization film.

When the adhesive layer 14 is a plasma polymerization film, examples of materials constituting the plasma polymerization film may include fluorocarbon monomers such as $CF_4$, $CHF_3$ and $CH_3F$, hydrocarbon monomers such as methane, ethane, propane, ethylene, propylene, acetylene, benzene, toluene and $C_4H_8$, hydrogen, $SF_6$, etc. Particularly, a plasma polymerization film made of a fluorocarbon monomer or a hydrocarbon monomer is preferred. Each of those materials may be used alone, or two or more kinds of the materials may be mixed and used.

The thickness of the plasma polymerization film is preferably 1 to 100 nm, more preferably 1 to 50 nm and even more preferably 1 to 10 nm from the viewpoint of abrasion resistance.

<Substrate with Attached Dielectric Multilayer Film>

The substrate 16 with an attached dielectric multilayer film has a glass substrate 18, and a dielectric multilayer film 20 disposed on the glass substrate 18. Even if the substrate 16 with an attached dielectric multilayer film itself has a warp, the warp can be eliminated when the substrate 16 with an attached dielectric multilayer film is disposed on the adhesive layer 14 so as to adhere to the smooth surface of the adhesive layer 14.

The substrate 16 with an attached dielectric multilayer film may be warped before it is disposed on the adhesive layer 14. More specifically, the substrate 16 with an attached dielectric multilayer film may have an SORI (SORI value) of 130 μm or more, or 180 μm or more, before it is disposed on the adhesive layer 14. The upper limit of the SORI is not limited particularly, but it is preferably 500 μm or less, and more preferably 300 μm or less in terms of the handling property.

The SORI is one of parameters for quantifying the degree of a warp in a substrate. The SORI is measured in the following procedure using a surface shape measuring system Dyvoce (model number: K2-310) manufactured by Kohzu Precision Co., Ltd. Description will be made below along a glass substrate by way of example. However, another object to be measured (for example, the substrate with an attached dielectric multilayer film, the laminate, etc.) can be measured in the same procedure.

Figure 2:
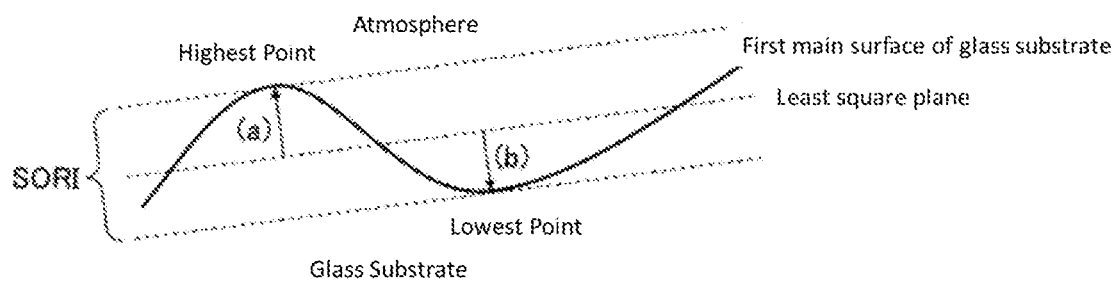
FIG. 2 is a schematic cross-sectional view for measuring SORI of a glass substrate.

The glass substrate is retained at three end points thereof, and the surface thereof is measured as to its displacement using a laser displacement gauge manufactured by Keyence Corporation. From the result of the measurement, SORI is calculated by the Dyvoce system. The SORI is one of parameters for quantifying the degree of a warp in the substrate. When a least square plane of a first main surface (front surface) of the glass substrate is regarded as reference height (least square plane height), the SORI indicates a total value ((a)+(b)) of a distance (a) between the height at the highest point of the first main surface and the reference height and a distance (b) between the height at the lowest point and the reference height. The SORI expressing a distance always takes a positive value (see FIG. 2).

On the other hand, the aforementioned measurement includes influence of bending due to the weight of the glass substrate itself. In order to eliminate the influence, according to the Dyvoce system, the glass substrate is reversed, and the back surface thereof is measured as to displacement in the same manner. Thus, the surface shapes of the front and back surfaces of the glass are measured, and based on a difference between data of the both, correction data from which the influence of bending due to the weight of itself has been eliminated can be obtained. In this manner, the influence of bending due to the weight of itself is canceled to calculate the SORI.

The correction of bending due to the weight itself and the data processing for obtaining the SORI are built in the Dyvoce system so as to be automatically calculated. In this measurement, by use of software "Dyvoce MAVs (Ver. 2.01.07-01)", SORI (WARP) is selected as Calculation Type to obtain a difference between the front and back surfaces and calculate the SORI.

Detailed description will be made below about the glass substrate 18 and the dielectric multilayer film 20.

(Glass Substrate)

The type of the glass substrate 18 may be a general one and examples thereof include the tradename "AN100" manufactured by Asahi Glass Co., Ltd., which is a glass sheet made of alkali-free borosilicate glass as a glass substrate for a display device such as an LCD or an OLED. The glass substrate 18 is excellent in chemical resistance and moisture resistance, and has a low thermal shrinkage rate. As the index of the thermal shrinkage rate, the linear expansion coefficient specified in JIS R 3102 (revised in 1995) is used.

A method for manufacturing the glass substrate 18 is not limited particularly. Typically, the glass substrate 18 is obtained by melting a glass raw material and forming the molten glass into a sheet shape. Such a forming method may be a general one and, for example, a float process, a fusion process, a slot down draw process, or the like may be used.

The type of the glass of the glass substrate 18 is not particularly limited, but an oxide-based glass containing silicon oxide as a main component thereof, such as alkali-free borosilicate glass, borosilicate glass, soda-lime glass, high silica glass, or the like is preferable. As the oxide-based glass, a glass having a silicon oxide content of 40 to 90 mass % in terms of oxide is preferable.

As the glass of the glass substrate 18, a glass suitable for the type of the member for an electronic device and manufacturing steps thereof is adopted. For example, a glass substrate for a liquid crystal panel is formed of a glass (alkali-free glass) substantially not containing alkali metal components since dissolution of an alkali metal component easily affects the liquid crystal (provided that alkaline earth metal components are included normally). As described above, the glass of the glass substrate 18 is appropriately selected based on the type of the device to which the glass is applied and the manufacturing steps thereof.

When the second main surface 16b (the surface on the glass substrate 18 side) of the substrate 16 with an attached dielectric multilayer film is bonded to another substrate during manufacturing of an electronic device such as a liquid crystal panel, the difference in the average linear expansion coefficient between the substrate and the glass substrate 18 at 25 to 300° C. is preferably $10 \times 10^{-7}$/° C. or less, more preferably $3 \times 10^{-7}$/° C. or less, and even more preferably $1 \times 10^{-7}$/° C. or less. If the difference is excessively large, there is a possibility that the glass laminate 10 will warp excessively or the support base material 12 and the substrate 16 with an attached dielectric multilayer film will peel apart in heating and cooling in the member-forming step. In a case where the material of the support base material 12 is the same as the material of the glass substrate 18, it is possible to suppress the occurrence of such warping or peeling. Another layer such as a bonding layer may exist between those substrates.

From the viewpoint of thinning and/or weight reduction, the thickness of the glass substrate 18 is preferably 0.5 mm or less, more preferably 0.4 mm or less, even more preferably 0.2 mm or less, and particularly preferably 0.1 mm or less. In a case where it is 0.5 mm or less, it is possible to impart favorable flexibility to the glass substrate 18. In a case of 0.2 mm or less, it is possible to wind the glass substrate 18 into a roll state.

In addition, the thickness of the glass substrate 18 is preferably 0.03 mm or more for reasons such as ease of manufacturing of the glass substrate 18 and ease of handling of the glass substrate 18.

Further, the area (the area of the main surface) of the glass substrate 18 is not particularly limited, but it is preferably 300 cm² or more in terms of productivity of an electronic device.

The glass substrate 18 may be constituted by two or more layers. In this case, materials forming each of the layers may be one and the same kind of material or may be different kinds of materials. In this case, the "thickness of the glass substrate 18" means the total thickness of all the layers.

(Dielectric Multilayer Film)

The dielectric multilayer film 20 is disposed on one surface of the glass substrate 18. According to one example, in which the dielectric multilayer film 20 serves as an antireflection film having a function of preventing reflection of light incident on the dielectric multilayer film 20, an antireflection film known in the background art can be used.

A preferred form of the dielectric multilayer film 20 functioning as an antireflection film includes a dielectric multilayer film in which dielectric layers different in refractive index are disposed alternately to utilize interference of light. The preferred form also includes one partially using a layer absorbing light. For specific characteristics, the dielectric multilayer film 20 may be used as a wide band antireflection film, an ultra-wide band half mirror, a dichroic mirror, a multi-wavelength antireflection film, a band pass filter, a notch filter, etc. in accordance with the film design based on a combination of materials thereof and film thicknesses thereof.

As dielectric materials contained in the dielectric layers, oxides, nitrides, fluorides or sulfides of at least one kinds of elements selected from the group consisting of Si, Ti, Zr, Ce, Mg, Zn, Hf, Y, Zn, In, Sn, Li, Ca, Nb, Ta and Al can be used suitably. From those materials, two or more kinds of materials different in refractive index from each other may be combined to form the dielectric multilayer film 20. Examples of two kinds of materials to be combined include $SiO_2$, $MgF_2$, $CaF_2$, LiF, etc. as a low-refractive-index material and $TiO_2$, $Ta_2O_5$, $Nb_2O_5$, $CeO_2$, MgO, ZnO, $HfO_2$, $Y_2O_3$, $ZrO_2$, ZnS, ITO, $In_2O_3$, etc. as a high-refractive-index material. The outermost surface of the dielectric multilayer film is often made of a low-refractive-index material. From the viewpoint of productivity and economy, a film containing Si atoms is often selected. As the film containing Si atoms, a film made of $SiO_2$ or SiN may be used, and $SiO_2$ is preferred. In addition, when the dielectric layer in the outermost surface of the dielectric multilayer film is $SiO_2$ (when the dielectric layer is made of $SiO_2$), the adhesion to the adhesive layer is more improved. Particularly when the adhesive layer is a silicone resin layer, the effect is increased.

Further, when at least one surface treatment selected from the group consisting of a corona treatment, an atmospheric plasma treatment and a UV ozone treatment is applied to the dielectric layer in the outermost surface of the dielectric multilayer film, the adhesion between the adhesive layer and the dielectric multilayer film is more improved. Among them, the corona treatment and the atmospheric plasma treatment are preferable as the surface treatments, and the corona treatment is more preferable.

That is, when the dielectric multilayer film having, in its outermost surface, a dielectric layer (particularly a layer made of $SiO_2$) subjected to such a surface treatment is used, the adhesion between the adhesive layer and the substrate with an attached dielectric multilayer film is more improved.

A preferred form of the dielectric multilayer film 20 is preferably a dielectric multilayer film in which high-refractive-index layers and low-refractive-index layers are disposed alternately. Examples of high-refractive-index materials contained in the high-refractive-index layers and examples of low-refractive-index materials contained in the low-refractive-index layers are respectively the same as described previously.

The number of dielectric layers in the dielectric multilayer film 20 is not particularly limited, and an optimum number of layers may be selected in accordance with an application. Several layers to 20 layers may be selected for a low-price and low-quality application. Several tens of layers to one hundred or more layers may be selected for a high-quality application (with a significantly wide band, with transmission or reflection close to zero, with a sharp change thereof, etc.).

The thickness of the dielectric multilayer film 20 is not particularly limited, but it is preferably 0.001 to 5 μm.

A method for manufacturing the dielectric multilayer film 20 is not particularly limited, but a known method may be used.

Examples thereof include a sputtering method, an electron beam method, an ion beam method, a vacuum deposition method, a plasma CVD method, a Cat-CVD method, an MBE method, a spin coating method, a dipping method, a spray coating method, an inkjet method, and the like.

Figure 3:
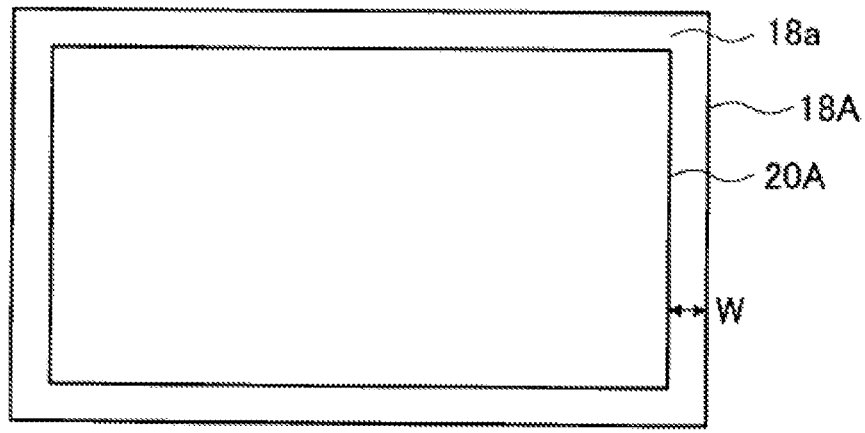
FIG. 3 is a top view of an embodiment of a substrate with an attached dielectric multilayer film.

The position where the dielectric multilayer film is disposed on the glass substrate is not particularly limited, but the dielectric multilayer film may be disposed on the surface of the glass substrate so that a peripheral region where the dielectric multilayer film is not disposed can be left on the surface of the glass substrate. More specifically, as illustrated in FIG. 3, a dielectric multilayer film 20A may be disposed on a central portion of a glass substrate 18A so that a picture-frame-like peripheral region 18a where the dielectric multilayer film 20A is not disposed can be left on the glass substrate 18A. In such an embodiment, the area of the region (film formation region) where the dielectric multilayer film 20A is disposed is narrower than the area of the surface (main surface) of the glass substrate 18A, and the dielectric multilayer film 20A is not formed along the outer circumference of the glass substrate 18A. In addition, the peripheral region 18a corresponds to a region located inside the outer circumferential edge of the glass substrate 18A.

When the dielectric multilayer film 20A is thus disposed on the glass substrate 18A, the yield of an electronic device may be affected in accordance with the position of the outer circumference of the dielectric multilayer film 20A. Specifically, a step corresponding to the film thickness of the dielectric multilayer film 20A is present in the border between the peripheral region 18a of the glass substrate 18A and the film formation region where the dielectric multilayer film 20A is located. Therefore, there is a case where the adhesive layer 14 cannot follow a sharp change of the surface shape caused by the step. In such a case, the peripheral region 18a of the glass substrate 18A and the adhesive layer 14 do not adhere to each other, but a gap portion may occur between the both. When such a gap portion is present, there is a fear that liquid used in the manufacturing process of the electronic device may enter the interface between the dielectric multilayer film 20A and the adhesive layer 14, causing fixing or peeling of the interface, and elution of the adhesive layer 14 causing pollution of the liquid used in the manufacturing process and pollution of equipment. Such problems can be improved by adjustment of the position of the outer circumference of the dielectric multilayer film 20A (the position of the film formation region). To say other words, the aforementioned problems can be improved by adjusting the magnitude of a width W of the peripheral region 18a, as illustrated in FIG. 3.

For example, when there is a region whose width W is very small, the aforementioned gap portion hardly appears in that portion, and the yield of the electronic device is improved. More specifically, it is preferable that the peripheral region 18a includes a region whose width W is in a range of 0.01 mm or less. It is more preferable that the width W is 0.01 mm or less all over the peripheral region 18a.

When there is a region whose width W is large to some extent, a gap portion where the adhesive layer 14 cannot adhere is generated in a step part corresponding to the film thickness of the dielectric multilayer film 20A. However, the adhesive layer 14 and the glass substrate 18A can adhere to each other in an end portion (outer edge portion) of the region. It is therefore possible to prevent the liquid used in the manufacturing process of the electronic device from entering the interface between the dielectric multilayer film 20A and the adhesive layer 14. As a result, the yield of the electronic device is improved. More specifically, it is preferable that the peripheral region 18a includes a region whose width W is in a range of 0.1 to 20 mm, and it is more preferable that the width W is 0.1 to 20 mm all over the peripheral region 18a. The width W is more preferably 0.3 mm or more, even more preferably 0.5 mm or more, and particularly preferably 1 mm or more. In addition, the upper limit thereof is more preferably 10 mm or less, and even more preferably 5 mm or less in order to increase the effective area where the electronic device can be formed.

The width W corresponds to a distance (shortest distance) between the outer circumferential edge (end portion) of the glass substrate 18A and the outer circumferential edge (end portion) of the dielectric multilayer film 20A. In addition, in the peripheral region 18a, the width W may differ from one position to another within the region, or may be fixed.

[Glass Laminate and Manufacturing Method Thereof]

The method for manufacturing the glass laminate 10 is not particularly limited, and a known method may be used. Typically the method includes an adhesive layer forming step where the adhesive layer 14 is formed on the support base material 12, and a lamination step where the substrate 16 with an attached dielectric multilayer film is laminated on the adhesive layer 14 to obtain the glass laminate 10.

The adhesive layer forming step and the lamination step will be described below in detail.

(Adhesive Layer Forming Step)

The adhesive layer-forming step is a step of forming the adhesive layer 14 on the support base material 12. By this step, a support base material with an attached adhesive layer is obtained. A method for forming the adhesive layer 14 is not particularly limited, and a known method may be used, and may be changed in accordance with the kind of material constituting the adhesive layer 14.

For example, when the adhesive layer 14 is an organic layer, examples of a method for producing the organic layer include a method (coating method) in which a curable resin composition containing a curable resin is applied onto the support base material 12 and the curable resin composition is cured to form the adhesive layer 14 fixed onto the support base material 12, a method (pasting method) in which a film-like adhesive layer 14 is fixed to the surface of the support base material 12, etc. Among them, the coating method is preferred since the bonding strength of the adhesive layer 14 to the support base material 12 is more excellent.

As a method for forming a layer of a curable resin composition on the surface of the support base material 12 in the coating method, for example, a method of coating the surface of the support base material 12 with the curable resin composition can be used. Examples of such methods of coating include a spray coating method, a die coating method, a spin coating method, a dip coating method, a roll coating method, a bar coating method, a screen printing method, a gravure coating method, and the like.

A curing method is not particularly limited, and optimum curing conditions are selected in accordance with a resin to be used. A heating treatment is typically used as the curing method.

An organic layer may be produced by another known method than the aforementioned method.

For example, a method for producing an adhesive layer including a fluororesin is not particularly limited. A method for producing an adhesive layer using a composition containing the fluororesin, or a method for producing an adhesive layer on a surface of a target by irradiation with plasma using fluorine-based gas may be used.

When the adhesive layer 14 is an inorganic layer, a known method may be used as a method for producing the inorganic layer. For example, a method in which the inorganic layer consisting of predetermined components is provided on the support base material 12 by a deposition method, a sputtering method or a CVD method may be used. The inorganic layer obtained by the aforementioned method is fixed onto the support base material 12, and an exposed surface of the inorganic layer can peelably adhere to the substrate 16 with an attached dielectric multilayer film.

For example, a method in which a resin composition containing a resin component such as a phenolic resin is applied onto the support base material 12 and subjected to a sintering treatment to be thereby carbonized may be also used as a method for producing an inorganic layer consisting of carbide (carbon material).

With respect to the production conditions, optimum conditions are selected appropriately depending of the materials used.

Before the lamination step which will be described below, a step of applying at least one surface treatment selected from the group consisting of a corona treatment, an atmospheric plasma treatment and a UV ozone treatment to the dielectric multilayer film of the substrate with an attached dielectric multilayer film including the glass substrate and the dielectric multilayer film disposed on the glass substrate may be performed.

(Lamination Step)

The lamination step is a step of laminating the substrate 16 with an attached dielectric multilayer film on the surface of the adhesive layer 14 obtained in the adhesive layer forming step described above to obtain the glass laminate 10 provided with the support base material 12, the adhesive layer 14 and the substrate 16 with an attached dielectric multilayer film in this order. That is, this step is a step of laminating the support base material with an attached adhesive layer and the substrate with an attached dielectric multilayer film.

The substrate 16 with an attached dielectric multilayer film is disposed on the adhesive layer 14 so that the dielectric multilayer film 20 in the substrate 16 with an attached dielectric multilayer film can be located on the adhesive layer 14 side.

The method for laminating the substrate 16 with an attached dielectric multilayer film on the adhesive layer 14 is not particularly limited, and a known method may be used.

For example, a method of overlapping the substrate 16 with an attached dielectric multilayer film on the surface of the adhesive layer 14 under a normal pressure environment may be used. As necessary, after overlapping the substrate 16 with an attached dielectric multilayer film on the surface of the adhesive layer 14, the substrate 16 with an attached dielectric multilayer film may be pressure bonded to the adhesive layer 14 by using a roll or a press. Bubbles interposed between the adhesive layer 14 and the layer of the substrate 16 with an attached dielectric multilayer film are relatively easily removed by pressure bonding by a roll or a press, which is preferred.

Pressure bonding by a vacuum lamination method or a vacuum press method is more preferable because the interposition of bubbles is suppressed and favorable adhesion is secured. Pressure bonding under a vacuum also has the advantage that, even in a case where minute bubbles remain, heating does not cause the bubbles to grow and distortion defects of the substrate 16 with an attached dielectric multilayer film are not easily caused.

When the substrate 16 with an attached dielectric multilayer film is laminated, it is preferable that the surface of the substrate 16 with an attached dielectric multilayer film which will be in contact with the adhesive layer 14 is washed sufficiently to perform lamination in an environment with high cleanliness. As the cleanliness is higher, the flatness of the substrate 16 with an attached dielectric multilayer film can be improved, which is preferred.

After the substrate 16 with an attached dielectric multilayer film is laminated, a pre-annealing treatment (heating treatment) may be performed if necessary. When the pre-annealing treatment is performed, the adhesion of the laminated substrate 16 with an attached dielectric multilayer film to the adhesive layer 14 is improved so that a proper peel strength (y) can be obtained to improve the productivity of the electronic device.

SORI of the glass laminate 10 is not particularly limited, but it is preferably 20 to 120 µm. The upper limit of the SORI is preferably 120 µm or less, more preferably 110 µm or less, and even more preferably 100 µm or less. When the SORI is 120 µm or less, the warp of the substrate can be cancelled to eliminate an adsorption failure of the substrate which may occur when the electronic device is to be manufactured.

The lower limit of the SORI is preferably 20 µm or more. When it is 20 µm or more, the SORI can be controlled stably and easily in spite of SORI of the support base material or a variation caused by the lamination method.

The method for measuring the SORI of the glass laminate 10 is the same as the aforementioned method for measuring the SORI of the substrate 16 with an attached dielectric multilayer film.

Second Embodiment

A second embodiment of a laminate according to the present invention is a glass laminate which includes a support base material, an adhesive layer and a glass substrate in this order, in which the glass substrate is peelably disposed on the adhesive layer, and the glass substrate before being disposed on the adhesive layer has an SORI of 130 µm or more.

In the background art, when a substrate having a large warp with an SORI of 130 or more is used alone to produce an electronic device, adsorption failure in the substrate occurs as described previously. As a result, the manufacturing yield of the electronic device deteriorates.

In the glass laminate according to this embodiment, in which the glass substrate having a predetermined warp in itself is disposed on the adhesive layer so as to adhere thereto, the glass substrate follows a flat surface in the surface of the adhesive layer so as to eliminate the warp belonging to the glass substrate itself. Therefore, an adsorption failure of the substrate which may occur when an electronic device is produced using the substrate alone can be eliminated so that the electronic device can be produced efficiently. After a member for the electronic device is disposed, the glass substrate where the member for the electronic device has been disposed can be peeled at the interface between the adhesive layer and the glass substrate. Thus, a desired electronic device can be obtained.

Figure 4:
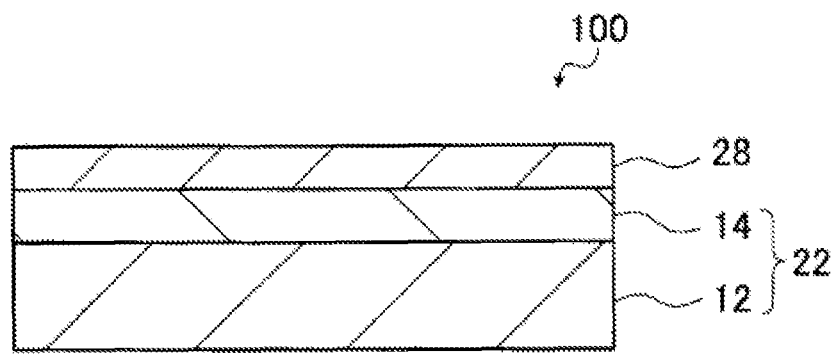
FIG. 4 is a schematic cross-sectional view of a second embodiment of a glass laminate according to the present invention.

FIG. 4 is a schematic cross-sectional view of the second embodiment of the glass laminate according to the present invention.

As illustrated in FIG. 4, a glass laminate 100 is a laminate which includes a support base material 12, a glass substrate 28, and an adhesive layer 14 present therebetween.

The glass laminate 100 includes similar members to those of the glass laminate 10, except that the glass substrate 28 to be used has a predetermined amount of warpage before it is disposed on the adhesive layer 14. The same reference signs are given to the same constituent elements, and description thereof will be omitted. Description will be made mainly about the glass substrate 28.

<Glass Substrate 28>

The glass substrate 28 is a glass substrate whose SORI is 130 µm or more before it is disposed on the adhesive layer 14. Even in the case of the glass substrate having such a large SORI, by using it to form a glass laminate, an adsorption failure caused by the warp of the glass substrate 28 can be eliminated.

The SORI may be 130 µm or more, or 180 µm or more. The upper limit of the SORI is not limited particularly, but it is preferably 500 µm or less, and more preferably 300 µm or less in terms of the handling property.

The SORI is measured by the same measuring method as the aforementioned SORI of the substrate 16 with an attached dielectric multilayer film.

A method for manufacturing the glass substrate 28 is not limited particularly. Typically, it is obtained by melting a glass raw material and forming the molten glass into a sheet shape. Such a forming method may be a general one and, for example, a float process, a fusion process, a slot down draw process, or the like may be used. Examples of methods that tend to cause a warp include the fusion process and the slot down draw process.

The type of the glass of the glass substrate 28 is not particularly limited, and includes the aforementioned types listed for the glass substrate 18.

From the viewpoint of thinning and/or weight reduction, the thickness of the glass substrate 28 is preferably 0.5 mm or less, more preferably 0.4 mm or less, even more preferably 0.2 mm or less, and particularly preferably 0.1 mm or less. In a case where the thickness is 0.5 mm or less, it is possible to impart favorable flexibility to the glass substrate 28. In a case of 0.2 mm or less, it is possible to wind the glass substrate 28 into a roll state.

In addition, the thickness of the glass substrate 28 is preferably 0.03 mm or more for reasons such as ease of manufacturing of the glass substrate 28 and ease of handling of the glass substrate 28.

As a method for manufacturing the glass laminate 100, a method using the glass substrate 28 in place of the substrate 16 with an attached dielectric multilayer film in the procedure described above in the first embodiment may be used.

Before the lamination step, in accordance with necessity, a step of applying at least one surface treatment selected from the group consisting of a corona treatment, an atmospheric plasma treatment and a UV ozone treatment to a film containing Si atoms in the substrate coated with the film containing Si atoms may be performed. In this case, the support base material with an attached adhesive layer including the support base material and the adhesive layer disposed on the support base material, and the substrate coated with the film containing Si atoms and subjected to the aforementioned surface treatment are laminated to obtain a predetermined laminate.

SORI of the glass laminate 100 is not particularly limited, but it is preferably 20 to 120 µm.

Although the case where a glass substrate is used as a substrate has been described in detail in the first embodiment and the second embodiment, the type of the substrate is not limited particularly.

Examples of the substrate include a metal sheet, a semiconductor substrate, a resin substrate, and a glass substrate. In addition, the substrate may be a substrate constituted by a plurality of materials belonging to one and the same type, such as a metal sheet composed of two different kinds of metals. Further, the substrate may be a composite substrate of different types of materials (such as two or more types of materials selected from metal, semiconductor, resin and glass), such as a substrate composed of a resin and a glass.

The thickness of the substrate such as a metal sheet or a semiconductor substrate is not limited particularly. However, from the viewpoint of thinning and/or weight reduction, the thickness is preferably 0.5 mm or less, more preferably 0.4 mm or less, even more preferably 0.2 mm or less, and particularly preferably 0.1 mm or less. In addition, the lower limit of the thickness is not particularly limited, but it is preferably 0.005 mm or more.

Further, the area (the area of the main surface) of the substrate is not particularly limited, but it is preferably 300 $cm^2$ or more in terms of productivity of an electronic device.

Further, the shape of the substrate is also not particularly limited, and it may be either rectangular or circular. In addition, an orientation flat (so-called ori-fla, which is a flat part formed in the outer circumference of the substrate) or a notch (which is one or more V-shaped notches formed in the outer circumferential edge of the substrate) may be formed in the substrate.

The surface of the substrate may be further coated with a film containing Si atoms (hereinafter also referred to as "Si film"). That is, a substrate with an attached Si film may be used as the substrate. Examples of the substrate with an attached Si film include a resin substrate with an attached Si film, a glass substrate with an attached Si film, a metal sheet with an attached Si film, a semiconductor substrate with an attached Si film, and the like.

It is preferable that the substrate with an attached Si film is used in the aforementioned second embodiment. It is more preferable that the substrate with an attached Si film is disposed in the laminate so that the Si film of the substrate with an attached Si film can adhere to the adhesive layer. When the Si film is used, the adhesion between the adhesive layer and the substrate with an attached Si film is more improved.

Examples of the Si film include a deposited film of silicon oxide, a sputtered film of silicon oxide, and a silicone resin film.

In addition, when the substrate with an attached Si film is used, at least one surface treatment selected from the group consisting of a corona treatment, an atmospheric plasma treatment and a UV ozone treatment is applied to the Si film before the substrate with an attached Si film is laminated on the adhesive layer, so that the adhesion between the adhesive layer and the substrate with an attached Si film is more improved. Among them, the corona treatment and the atmospheric plasma treatment are preferable as the surface treatments, and the corona treatment is more preferable.

As for the resin substrate with an attached Si film, when the resin substrate is too thin, the resin substrate in the laminate may be turned up easily during chamfering or washing of the laminate. Therefore, the peel strength of the resin substrate with an attached Si film is preferably 1.2 N/25 mm or more, more preferably 4.0 N/25 mm or more.

<Laminate>

Laminates according to the present invention (the glass laminate 10 according to the first embodiment and the glass laminate 100 according to the second embodiment) can be used for various applications. Examples of the applications include applications for manufacturing electronic components such as a display device panel to be described below, a PV, a thin film secondary battery, and a semiconductor wafer having a circuit formed on the surface thereof. Particularly in the form where the substrate 16 with an attached dielectric multilayer film having an antireflection function is used, as will be described later, an antireflection film is included in an obtained electronic device. Thus, the obtained electronic device can be used suitably for an application requiring antireflection.

Here, the display device panel includes an LCD, an OLED, an electronic paper, a plasma display panel, a field emission panel, a quantum dot LED panel, an MEMS (Micro Electro Mechanical Systems) shutter panel, and the like.

In addition, the laminates can be used suitably for applications of optical elements such as lenses or sensors requiring optical characteristics which can be implemented by dielectric multilayer films.

<Electronic Device and Manufacturing Method Thereof>

In the present invention, an electronic device including a substrate and a member for the electronic device (hereinafter also referred to as "glass substrate with an attached member" if necessary) is manufactured using the aforementioned laminate (the glass laminate 10 according to the first embodiment or the glass laminate 100 according to the second embodiment). More specifically, when the glass laminate 10 is used, an electronic device including the substrate 16 with an attached dielectric multilayer film and a member for the electronic device is manufactured. On the other hand, when the glass laminate 100 is used, an electronic device including the glass substrate 28 and a member for the electronic device is manufactured. A method for manufacturing an electronic device includes not only a case where film forming, processing such as etching, various heat treatments, etc. are performed directly on the laminate, but also a case where another substrate having an electronic device formed thereon is pasted directly by a bonding agent or through a seal material.

The method for manufacturing an electronic device is not particularly limited. However, from the viewpoint of excellent productivity of the electronic device, preferred is a method in which a member for an electronic device is formed on the substrate in the laminate to thereby manufacture a laminate with an attached member for an electronic device, and the obtained laminate with an attached member for an electronic device is separated into an electronic device and a support base material with an attached adhesive layer with a substrate-side interface of the adhesive layer as a peeling surface.

In the following description, the step in which a member for an electronic device is formed on the substrate in the laminate to thereby manufacture a laminate with an attached member for an electronic device will be referred to as a member-forming step, and the step in which the laminate with an attached member for an electronic device is separated into an electronic device and a support base material with an attached adhesive layer with a substrate-side interface of the adhesive layer as a peeling surface will be referred to as a separation step.

Materials and a procedure used in each step will be described in detail along an example in which the glass laminate 10 is used.

(Member-Forming Step)

Figure 5A:
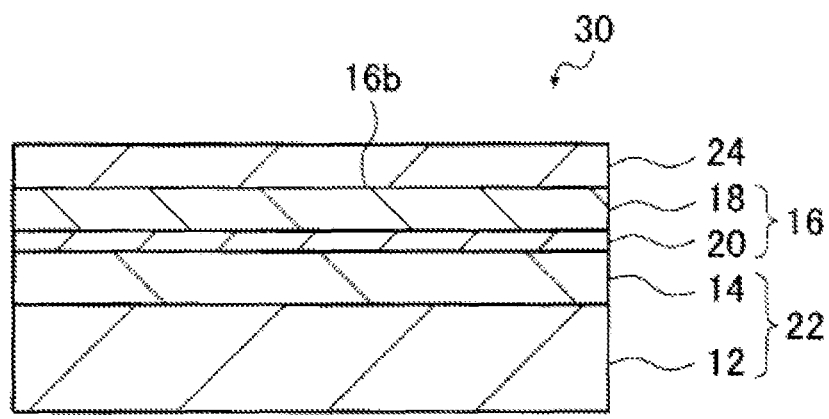
FIG. 5A and FIG. 5B are schematic cross-sectional views illustrating an embodiment of a method for manufacturing an electronic device according to the present invention, following the order of steps.

The member-forming step is a step of forming a member for an electronic device on the glass substrate 18 in the glass laminate 10 obtained in the aforementioned lamination step. More specifically, as illustrated in FIG. 5A, a member 24 for an electronic device is disposed on the second main surface 16b (exposed surface) of the substrate 16 with an attached dielectric multilayer film so as to obtain a laminate 30 with an attached member for an electronic device.

First, the member 24 for an electronic device to be used in this step will be described in detail, and the procedure of the step will be then described in detail.

(Member for Electronic Device (Functional Element))

The member 24 for an electronic device is a member which will be formed on the substrate 16 with an attached dielectric multilayer film in the glass laminate 10 so as to form at least a part of an electronic device. More specifically, examples of the member 24 for an electronic device include members to be used in a display device panel, a photovoltaic cell, a thin film secondary battery, an electronic component such as a semiconductor wafer having a circuit formed on a surface thereof, etc. (such as a member for a display device, a member for a photovoltaic cell, a member for a thin film secondary battery, and a circuit for an electronic component).

Examples of members for a photovoltaic cell include, as a thin silicon-type one, a transparent electrode such as a tin oxide of a positive electrode, a silicon layer represented by a p layer/i layer/n layer, a metal of a negative electrode, and the like, as well as various members corresponding to a compound-type, a dye sensitization-type, a quantum dot-type, and the like.

In addition, examples of members for a thin film secondary battery include, as a lithium ion-type one, a transparent electrode such as a metal or a metal oxide of a positive electrode or a negative electrode, a lithium compound of an electrolyte layer, a metal of a current collecting layer, a resin as a sealing layer, and the like, as well as various members corresponding to a nickel hydrogen-type, a polymer-type, a ceramic electrolyte-type, and the like.

In addition, examples of members for circuits for electronic components include, as solid-state image pickup devices such as CCDs or CMOSs, metals for a conductive portion, silicon oxide or silicon nitride for an insulating portion, and the like.

Other examples include various sensors such as a pressure sensor and an acceleration sensor or various members corresponding to a rigid printed circuit board, a flexible printed circuit board, a rigid flexible printed circuit board, and the like.

(Step Procedure)

A method for manufacturing the laminate 30 with an attached member for an electronic device described above is not particularly limited. The member 24 for an electronic device may be formed on the second main surface 16b of the substrate 16 with an attached dielectric multilayer film in the glass laminate 10 by a known method based on the type of the constituent members of the member for an electronic device.

Here, the member 24 for an electronic device may be not all of the members (referred to below as the "all members") finally formed on the second main surface 16b of the substrate 16 with an attached dielectric multilayer film, but a part of all the members (referred to below as "part of the members"). A substrate with part of the members attached thereto, which has been peeled from the adhesive layer 14, may be processed to a substrate with all members attached thereto in a subsequent step.

In addition, another member for an electronic device may be formed on the peeling surface (the first main surface 16a) of the substrate with all members attached thereto, which has been peeled from the adhesive layer 14. In addition, a laminate with all members attached thereto may be assembled, followed by peeling off the support base material 22 with an attached adhesive layer from the laminate with all members attached thereto, to manufacture an electronic device. Furthermore, two laminates with all members attached thereto may be used and assembled, followed by peeling off the two support base materials 22 with attached adhesive layers from the laminate with all members attached thereto, to manufacture a substrate with an attached member having two substrates with attached dielectric multilayer films.

For example, taking the case of manufacturing an OLED as an example, in order to form an organic EL structure on the surface (the second main surface 16b) of the substrate 16 with an attached dielectric multilayer film in the glass laminate 10 on the opposite side to the adhesive layer 14 side, various layer forming and treatments are performed such as forming a transparent electrode, depositing, on the surface on which the transparent electrode has been formed, a hole injecting layer, a hole transporting layer, a light emitting layer, an electron transporting layer and the like, forming a back electrode, and sealing by using a sealing plate. Specific examples of the layer forming and treatments include film formation treatments, vapor deposition treatments, sealing plate adhesion treatments, and the like.

In addition, for example, in the case of manufacturing a TFT-LCD, there are various types of steps such as a TFT forming step of forming a pattern on a metal film, a metal oxide film or the like formed by a general film forming method such as a CVD method or a sputtering method, by using a resist solution on the second main surface 16b of the substrate 16 with an attached dielectric multilayer film in the glass laminate 10 to form a thin film transistor (TFT), a CF forming step of forming a color filter (CF) by using a resist solution for pattern formation on the second main surface 16b of the substrate 16 with an attached dielectric multilayer film in another glass laminate 10, and a bonding step of laminating the laminate with an attached TFT obtained in the TFT forming step and the laminate with an attached CF obtained in the CF forming step.

In the TFT forming step or the CF forming step, the TFT or the CF is formed on the second main surface 16b of the substrate 16 with an attached dielectric multilayer film by using known photolithography techniques, etching techniques, or the like. At this time, a resist solution is used as a coating solution for pattern formation.

Here, the second main surface 16b of the substrate 16 with an attached dielectric multilayer film may be cleaned before forming the TFT or the CF, as necessary. As a cleaning method, a known dry cleaning or wet cleaning may be used.

In the bonding step, the thin film transistor forming surface of the laminate with an attached TFT and the color filter forming surface of the laminate with an attached CF are made to face each other and bonding is performed by using a sealing agent (for example, an ultraviolet curable sealing agent for cell formation). Thereafter, a liquid crystal material is injected into the cell formed by the laminate with an attached TFT and the laminate with an attached CF.

Examples of a method for injecting the liquid crystal material include a reduced pressure injection method and a dropping injection method.

(Separation Step)

Figure 5B:
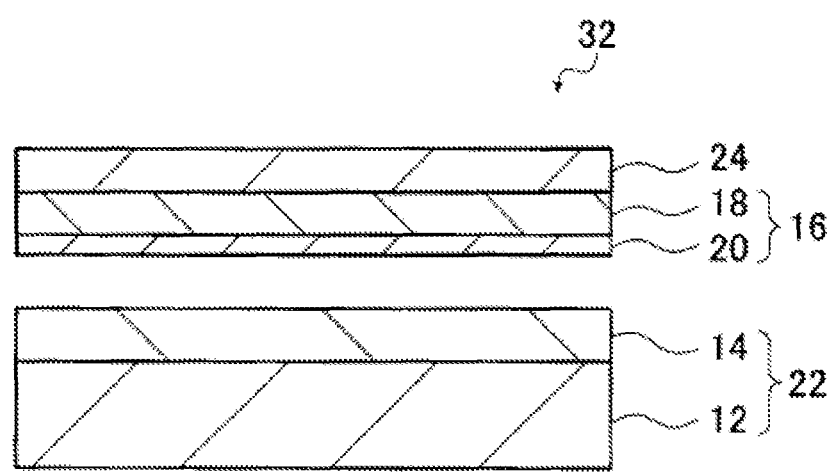

As illustrated in FIG. 5B, the separation step is a step in which the laminate 30 with an attached member for an electronic device obtained in the member-forming step is separated into the substrate 16 with an attached dielectric multilayer film laminated with the member 24 for an electronic device (electronic device) and the support base material 22 with an attached adhesive layer with the interface between the adhesive layer 14 and the substrate 16 with an attached dielectric multilayer film as a peeling surface to obtain an electronic device 32.

In a case where the member 24 for an electronic device on the substrate 16 with an attached dielectric multilayer film at the time of peeling is only a part for forming all of the necessary constituent members, it is also possible to form the remaining constituent members on the substrate 16 with an attached dielectric multilayer film after the separation.

The method for peeling off the substrate 16 with an attached dielectric multilayer film and the support base material 12 is not particularly limited. Specifically, for example, after a sharp blade like object is inserted into the interface between the substrate 16 with an attached dielectric multilayer film and the adhesive layer 14 to give a trigger of peeling, a mixed fluid of water and compressed air may be blown to separate the both. Preferably, the laminate 30 with an attached member for an electronic device is set on a platen so that the support base material 12 is on the upper side and the side of the member 24 for an electronic device is on the lower side. The side of the member 24 for an electronic device is vacuum adsorbed on the platen (carried out sequentially in a case where the support base materials are laminated on both surfaces). In this state, a blade is first inserted into the interface between the substrate 16 with an attached dielectric multilayer film and the adhesive layer 14. Thereafter, the support base material 12 side is adsorbed by a plurality of vacuum adsorption pads, and the vacuum adsorption pads are raised in order from the vicinity of the place where the blade is inserted. Accordingly, an air layer is formed at the interface between the adhesive layer 14 and the substrate 16 with an attached dielectric multilayer film or in a cohesive breaking surface of the adhesive layer 14, and the air layer spreads all over the interface or the cohesive breaking surface. Thus, it is possible to easily peel off the support base material 12.

A laser may be used to form a trigger of peeling or to perform the peeling.

In addition, the support base material 22 with an attached adhesive layer may be laminated with a new substrate with an attached dielectric multilayer film to manufacture the glass laminate 10 of the present invention.

Here, when the electronic device 32 is separated from the laminate 30 with an attached member for an electronic device, electrostatic attraction of fragments of the adhesive layer 14 to the electronic device 32 can be further suppressed by spraying with an ionizer or controlling the humidity.

The method for manufacturing the electronic device 32 described above is suitable for manufacturing a compact display device used for a mobile terminal such as a mobile phone or a PDA. The display device is mainly an LCD or OLED, and includes, as the LCD, TN-type, STN-type, FE-type, TFT-type, MIM-type, IPS-type, VA-type, and the like. Basically, it can be applied to display devices which are either passive drive-type or active drive-type.

Examples of the electronic device 32 manufactured by the above method include a panel for a display device having a glass substrate and a member for a display device, a photovoltaic cell having a glass substrate and a member for a photovoltaic cell, a thin film secondary battery having a glass substrate and a member for a thin film secondary battery, an electronic component having a glass substrate and a member for an electronic device, and the like. Examples of panels for a display device include liquid crystal panels, organic EL panels, plasma display panels, field emission panels, and the like.

Although the method for manufacturing an electronic device using the glass laminate 10 according to the first embodiment has been described above, the electronic device can be also manufactured in same procedure using the glass laminate 100 according to the second embodiment in place of the glass laminate 10.

EXAMPLE

The present invention will be described specifically below with reference to Examples and the like, but the present invention is not limited by these Examples.

In the following Example 1, a glass sheet (having a diameter of 200 mm, a sheet thickness of 0.5 mm and a linear expansion coefficient of $38 \times 10^{-7}$/° C., tradename "AN100" manufactured by Asahi Glass Co., Ltd.) made of alkali-free borosilicate glass was used as a support base material. On the other hand, a glass sheet (having a diameter of 200 mm, a sheet thickness of 0.4 mm and a linear expansion coefficient of $38 \times 10^{-7}$/° C., tradename "AN100" manufactured by Asahi Glass Co., Ltd.) made of alkali-free borosilicate glass was used as a glass substrate.

SORI of each member that will be described later was measured by the aforementioned method.

Example 1

First, the support base material having a sheet thickness of 0.5 mm was cleaned by pure water cleaning and then UV cleaning.

Next, alkenyl-group-containing organopolysiloxane (number average molecular weight: 2,000, number of alkenyl groups: 2 or more) (100 parts by mass) and hydrogenpolysiloxane (number average molecular weight: 2,000, number of hydrosilyl groups: 2 or more) (6.7 parts by mass) were mixed. The mixing molar ratio (number of moles of hydrosilyl groups/number of moles of alkenyl groups) between the alkenyl groups in the alkenyl-group-containing organopolysiloxane and the hydrosilyl groups in the hydrogenpolysiloxane was 0.4/1. Further, 300 ppm of a catalyst (platinum catalyst) was added to the total mass (100 parts by mass) of the alkenyl-group-containing organopolysiloxane and the hydrogenpolysiloxane. This solution is referred to as a curable resin composition X. The curable resin composition X was applied onto a first main surface of the support base material by using a die coater to provide, on the support base material, an uncured layer including the alkenyl-group-containing organopolysiloxane and the hydrogenpolysiloxane.

Next, heating was performed at 140° C. for 3 minutes in the atmosphere, followed by heating curing at 230° C. for 20 minutes in the atmosphere to form a silicone resin layer having a thickness of 10 μm on the first main surface of the support base material. The silicone resin layer had good flatness.

A dielectric multilayer film was manufactured on a glass substrate in the following procedure.

The glass substrate was washed, and four layers, that is, an $Nb_2O_5$ film, an $SiO_2$ film, an $Nb_2O_5$ film, and an $SiO_2$ film were formed in this order by a sputtering apparatus to form a dielectric multilayer film having a total film thickness of 250 nm and a visible reflectance of 0.5%.

SORI of the obtained glass substrate with an attached dielectric multilayer film was 185 μm.

The dielectric multilayer film was disposed on the surface of the glass substrate so that a picture-frame-like peripheral region where the dielectric multilayer film was not disposed was left on the surface of the glass substrate (see FIG. 3). In addition, a width W of the peripheral region (a distance between an interface between a region where the dielectric multilayer film was formed and a region where the dielectric multilayer film was not formed, and an outer circumferential edge of the glass substrate) was 0.005 mm all over the region.

Next, the obtained glass substrate with an attached dielectric multilayer film and the silicone resin layer surface of the support base material were pasted on each other by vacuum press under a room temperature so that the dielectric multilayer film and the silicone resin layer adhered to each other. Thus, a glass laminate A was obtained.

In the obtained glass laminate A, the support base material and the glass substrate with an attached dielectric multilayer film adhered to the silicone resin layer without forming bubbles. In addition, there was no distortion defect. Further, in the glass laminate A, the peel strength at the interface between the silicone resin layer and the layer of the support base material was larger than the peel strength at the interface between the glass substrate with an attached dielectric multilayer film and the silicone resin layer.

In addition, SORI of the glass laminate A was 100 μm as a result of measurement performed in the same manner as the aforementioned measurement of the glass substrate.

Next, a member for an electronic device was manufactured on the glass substrate of the glass laminate A by the following method.

A method for forming an organic EL structure on the glass substrate was carried out as the method for manufacturing a member for an electronic device. Specifically, a step of forming a transparent electrode, a step of depositing a hole injecting layer, a hole transporting layer, a light emitting layer, an electron transporting layer, and a sealing step were carried out to form the organic EL structure.

Then, a stainless-steel blade having a thickness of 0.1 mm was inserted into the interface between the glass substrate and the silicone resin layer in one of the four corner portions of the glass laminate A where the member for an electronic device had been manufactured, so as to form a notch portion for peeling, while vacuum adsorption pads adsorbed a surface of the support base material which was not a peeling surface, and an external force was applied in a direction in which the support base material and the electronic device (which is an electronic device including the glass substrate with an attached dielectric multilayer film and the member for the electronic device) could be separated from each other. Thus, the support base material and the electronic device were separated without being damaged. Here, the insertion of the blade was performed while static eliminating fluid was sprayed from an ionizer (manufactured by Keyence Corporation) onto the interface. Specifically, the vacuum adsorption pads were raised while continuously spraying the static eliminating fluid from the ionizer toward a gap formed.

According to the aforementioned procedure, the adsorption failure caused by the warp of the glass substrate with an attached dielectric multilayer film was eliminated, and the manufacturing yield of the electronic device did not deteriorate. In addition, after the glass laminate A was obtained, the film surface of the dielectric multilayer film was protected by the support base material. Thus, during the process until peeling off the support base material, there was no fear that the manufacturing yield might deteriorate due to damage on the dielectric multilayer film or peeling of the film. In addition, it was also confirmed that no process liquid entered the inside of the glass laminate A from an end portion of the glass laminate A.

Example 1-1

A glass laminate A-1 was obtained in the same procedure as in Example 1, except that after the glass substrate was washed, three layers, that is, an $Nb_2O_5$ film, an $SiO_2$ film, and an $Nb_2O_5$ film were formed in this order by a sputtering apparatus to thereby form a dielectric multilayer film having a total film thickness of 200 nm.

SORI of the obtained glass sheet with an attached dielectric multilayer film and SORI of the obtained glass laminate A-1 were substantially equal to the SORI of the glass sheet with an attached dielectric multilayer film and the SORI of the glass laminate A in Example 1, respectively.

In addition, using the glass laminate A-1 in place of the glass laminate A, an electronic device was manufactured in the same procedure as in Example 1. In the same manner as in Example 1, there was no deterioration in the manufacturing yield.

The outermost dielectric layer of the dielectric multilayer film in the glass sheet with an attached dielectric multilayer film was an $Nb_2O_5$ film, and this layer adhered to the silicone resin layer.

Next, in the same procedure as in (Method for Measuring Peel Strength) which will be described later, peel strength of the glass sheet with an attached dielectric multilayer film in each of the glass laminate A and the glass laminate A-1 was measured. As a result, the peel strength of the glass sheet with an attached dielectric multilayer film in the glass laminate A was larger. From this result, it was confirmed that the adhesion of the glass sheet with an attached dielectric multilayer film was more improved when the outermost dielectric layer of the dielectric multilayer film was an $SiO_2$ film.

Example 1-2

A glass laminate A-2 was obtained in the same procedure as in Example 1, except that a corona treatment was performed on an $SiO_2$ film which was the outermost dielectric layer of the dielectric multilayer film in the glass sheet with an attached dielectric multilayer film.

SORI of the obtained glass sheet with an attached dielectric multilayer film and SORI of the obtained glass laminate A-2 were substantially equal to the SORI of the glass sheet with an attached dielectric multilayer film and the SORI of the glass laminate A in Example 1, respectively.

In addition, using the glass laminate A-2 in place of the glass laminate A, an electronic device was manufactured in the same procedure as in Example 1. In the same manner as in Example 1, there was no deterioration in the manufacturing yield.

The outermost dielectric layer of the dielectric multilayer film in the glass sheet with an attached dielectric multilayer film was an SiO$_2$ film subjected to the corona treatment, and this layer adhered to the silicone resin layer.

Next, in the same procedure as in (Method for Measuring Peel Strength) which will be described later, peel strength of the glass sheet with an attached dielectric multilayer film in each of the glass laminate A and the glass laminate A-2 was measured. As a result, the peel strength of the glass sheet with an attached dielectric multilayer film in the glass laminate A-2 was larger. From this result, it was confirmed that the adhesion of the glass sheet with an attached dielectric multilayer film was more improved when the outermost dielectric layer of the dielectric multilayer film was an SiO$_2$ film subjected to the corona treatment.

Example 2

In the same procedure as in Example 1, except that a glass substrate having a sheet thickness of 0.2 mm and a diameter of 300 mm was used, four layers, that is, an Nb$_2$O$_5$ film, an SiO$_2$ film, an Nb$_2$O$_5$ film, and an SiO$_2$ film were formed in this order by a sputtering apparatus. Thus, a dielectric multilayer film having a total film thickness of 250 nm and a visible reflectance of 0.5% was formed. In addition, a width W of a peripheral region was 5 mm.

SORI of the obtained glass substrate with an attached dielectric multilayer film was 195 μm.

Next, in the same procedure as in Example 1, a glass laminate B was obtained, and SORI of the glass laminate B was then measured. The SORI did not exceed 115 μm.

Using the glass laminate B in place of the glass laminate A, an electronic device was manufactured in the same procedure as in Example 1. In the same manner as in Example 1, there was no deterioration in the manufacturing yield. In addition, it was also confirmed that no process liquid entered the inside of the glass laminate B from an end portion of the glass laminate B.

Example 3

A glass laminate C was obtained in the same procedure as in Example 1, except that a glass sheet whose SORI was 135 μm was used as the glass substrate and no dielectric multilayer film was formed. In the obtained glass laminate C, the support base material and the glass substrate adhered to the silicone resin layer without forming bubbles, and there was no distortion defect. In addition, in the glass laminate C, peel strength at the interface between the silicone resin layer and the layer of the support base material was larger than peel strength at the interface between the glass substrate and the silicone resin layer. In addition, as a result of measurement performed in the same manner as in Example 1, the SORI of the glass laminate C was 80 μm.

Using the glass laminate C in place of the glass laminate A, an electronic device was manufactured in the same procedure as in Example 1. In the same manner as in Example 1, there was no deterioration in the manufacturing yield.

Example 4

A glass laminate D was obtained in the same procedure as in Example 1, except that a width W of a peripheral region was 0.7 mm all over the region. In the obtained glass laminate D, the support base material and the glass substrate adhered to the silicone resin layer without forming bubbles, and there was no distortion defect. In addition, in the glass laminate D, peel strength at the interface between the silicone resin layer and the layer of the support base material was larger than peel strength at the interface between the glass substrate and the silicone resin layer. In addition, as a result of measurement performed in the same manner as in Example 1, the SORI of the glass laminate D was 70 μm.

Using the glass laminate D in place of the glass laminate A, an electronic device was manufactured in the same procedure as in Example 1. In the same manner as in Example 1, there was no deterioration in the manufacturing yield. In addition, it was also confirmed that no process liquid entered the inside of the glass laminate D from an end portion of the glass laminate D.

Example 5

A glass laminate E was obtained in the same procedure as in Example 1, except that a width W of a peripheral region was 0.15 mm all over the region. In the obtained glass laminate E, the support base material and the glass substrate adhered to the silicone resin layer without forming bubbles, and there was no distortion defect. In addition, in the glass laminate E, peel strength at the interface between the silicone resin layer and the layer of the support base material was larger than peel strength at the interface between the glass substrate and the silicone resin layer. In addition, as a result of measurement performed in the same manner as in Example 1, the SORI of the glass laminate E was 70 μm.

Using the glass laminate E in place of the glass laminate A, an electronic device was manufactured in the same procedure as in Example 1. Peeling at a part of the interface caused by the process liquid entering the inside of the glass laminate E from an end portion of the glass laminate E was confirmed. In addition, the manufacturing yield of the electronic device was reduced by 0.5% as compared with that in Example 1.

Example 6

A glass laminate F was obtained in the same procedure as in Example 1, except that a width W of a peripheral region was 0.08 mm all over the region. In the obtained glass laminate F, the support base material and the glass substrate adhered to the silicone resin layer without forming bubbles, and there was no distortion defect. In addition, in the glass laminate F, peel strength at the interface between the silicone resin layer and the layer of the support base material was larger than peel strength at the interface between the glass substrate and the silicone resin layer. In addition, as a result of measurement performed in the same manner as in Example 1, the SORI of the glass laminate F was 70 μm.

Using the glass laminate F in place of the glass laminate A, an electronic device was manufactured in the same procedure as in Example 1. Peeling at a part of the interface caused by the process liquid entering the inside of the glass laminate F from an end portion of the glass laminate F was confirmed. In addition, the manufacturing yield of the electronic device was reduced by 3% as compared with that in Example 1.

Comparative Example 1

Using the glass substrate whose SORI was 135 μm, which was used in Example 3, in place of the glass laminate A, an electronic device was manufactured in the same procedure as in Example 1. Due to adsorption failure of the glass substrate, the manufacturing yield of the electronic device was reduced by 12% as compared with that in Example 1.

Comparative Example 2

Using the glass substrate (SORI: 185 μm) with an attached dielectric multilayer film, which was manufactured in Example 1, in place of the glass laminate A, an electronic device was manufactured in the same procedure as in Example 1. Due to adsorption failure of the glass substrate with an attached dielectric multilayer film, the manufacturing yield of the electronic device was reduced by 15% as compared with that in Example 1. In addition, flaws generated during the process were observed here and there in the dielectric multilayer film.

Example 7

A laminate G was obtained in the same procedure as in Example 1, except that a PET film (Lumirror T60, thickness 25 manufactured by Toray Industries Inc.) having SORI of 180 μm was used in place of the glass substrate, and no dielectric multilayer film was formed. In the obtained laminate G, the support base material and the PET film adhered to the silicone resin layer without forming bubbles, and there was no distortion defect. In addition, in the laminate G, peel strength at the interface between the silicone resin layer and the layer of the support base material was larger than peel strength at the interface between the PET film and the silicone resin layer. In addition, as a result of measurement performed in the same manner as in Example 1, the SORI of the laminate G was 105 μm.

When the laminate G exhibiting SORI substantially the same as that of the glass laminate A is used, an electronic device can be manufactured with good yield in the same manner as when the glass laminate A is used.

When the laminate G was vacuum adsorbed by a spin coater, it could be adsorbed without any problem.

When five laminates G were washed with water by a washer with a pure water shower mechanism, film peeling occurred in all the laminates.

The following peeling test was performed on the laminate G; and peel strength (N/25 mm) of the PET film was measured. The peel strength in this case was 0.46 N/25 mm.
(Method for Measuring Peel Strength)

As for the method for measuring peel strength, the laminate G having a width of 25 mm and a length of 70 mm was prepared, and the PET film was peeled off by use of Autograph AG-20/50 kNXD plus (Shimadzu Corporation). On that occasion, a stainless-steel blade having a thickness of 0.1 mm was inserted into the interface between the PET film and the silicone resin layer so as to form a notch portion for peeling. After that, peel strength was measured by completely fixing the PET film and raising the support base material. Here, the peeling rate was 30 mm/min. A point where a load was detected was regarded as 0, and peel strength at a position where the support base material was raised by 1.5 mm from the point of 0 was obtained as a measured value.

Example 8

A laminate H was obtained in the same procedure as in Example 7, except that a PET film with an attached silica-deposited film (Techbarrier L PET, thickness 12 μm, manufactured by Mitsubishi Plastics, Inc.) whose SORI was 210 μm was used in place of the glass substrate, and laminated with the silica-deposited surface facing toward the support base material. In the obtained laminate H, the support base material and the PET film with an attached silica-deposited film adhered to the silicone resin layer without forming bubbles, and there was no distortion defect. In addition, in the laminate H, peel strength at the interface between the silicone resin layer and the layer of the support base material was larger than peel strength at the interface between the PET film with an attached silica-deposited film and the silicone resin layer. In addition, as a result of measurement performed in the same manner as in Example 1, the SORI of the laminate H was 105 μm.

When the laminate H exhibiting SORI substantially the same as that of the glass laminate A is used, an electronic device can be manufactured with good yield in the same manner as when the glass laminate A is used.

When the laminate H was vacuum adsorbed by a spin coater, it could be adsorbed without any problem.

When five laminates H were washed with water by a washer with a pure water shower mechanism, film peeling occurred in two laminates.

The peeling test according to the aforementioned (Method for Measuring Peel Strength) was performed on the laminate H, and peel strength (N/25 mm) of the PET film with an attached silica-deposited film was measured. The peel strength in this case was 1.75 N/25 mm.

Example 9

A laminate I was obtained in the same procedure as in Example 7, except that a PET film with an attached silica-deposited film (Techbarrier L PET, thickness 12 μm, manufactured by Mitsubishi Plastics, Inc.) whose SORI was 210 μm was used in place of the glass substrate, a corona treatment was performed on the silica-deposited film immediately before the PET film with an attached silica-deposited film was laminated, and the PET film with an attached silica-deposited film was then laminated with the silica-deposited surface facing toward the support base material. In the obtained laminate I, the support base material and the PET film with an attached silica-deposited film adhered to the silicone resin layer without forming bubbles, and there was no distortion defect. In addition, in the laminate I, peel strength at the interface between the silicone resin layer and the layer of the support base material was larger than peel strength at the interface between the PET film with an attached silica-deposited film and the silicone resin layer. In addition, as a result of measurement performed in the same manner as in Example 1, the SORI of the laminate I was 105 μm.

When the laminate I exhibiting SORI substantially the same as that of the glass laminate A is used, an electronic device can be manufactured with good yield in the same manner as when the glass laminate A is used.

When the laminate I was vacuum adsorbed by a spin coater, it could be adsorbed without any problem.

When five laminates I were washed with water by a washer with a pure water shower mechanism, film peeling did not occur in any of the five laminates.

The peeling test according to the aforementioned (Method for Measuring Peel Strength) was performed on the laminate I, and peel strength (N/25 mm) of the PET film with an attached silica-deposited film was measured. The peel strength in this case was 4.17 N/25 mm.

Example 10

A laminate J was obtained in the same procedure as in Example 7, except that a PET film with an attached silicone film (model number: 50E-0010-CHK thickness 50 μm, manufactured by Fujimori Kogyo Co., Ltd.) whose SORI was 190 μm was used in place of the glass substrate, a corona treatment was performed on the silicone film immediately before the PET film with an attached silicone film was laminated, and the PET film with an attached silicone film was then laminated with the silicone film surface facing toward the support base material. In the obtained laminate J, the support base material and the PET film with an attached silicone film adhered to the silicone resin layer without forming bubbles, and there was no distortion defect. In addition, in the laminate J, peel strength at the interface between the silicone resin layer and the layer of the support base material was larger than peel strength at the interface between the PET film with an attached silicone film and the silicone resin layer. In addition, as a result of measurement performed in the same manner as in Example 1, the SORI of the laminate J was 100 μm.

When the laminate J exhibiting SORI substantially the same as that of the glass laminate A is used, an electronic device can be manufactured with good yield in the same manner as when the glass laminate A is used.

When the laminate J was vacuum adsorbed by a spin coater, it could be adsorbed without any problem.

When five laminates J were washed with water by a washer with a pure water shower mechanism, film peeling did not occur in any of the five laminates.

The peeling test according to the aforementioned (Method for Measuring Peel Strength) was performed on the laminate J, and peel strength (N/25 mm) of the PET film with an attached silicone film was measured. The peel strength in this case was 4.25 N/25 mm.

Example 11

A laminate K was obtained in the same procedure as in Example 7, except that a PET film with an attached acrylic adhesive whose SORI was 190 μm was used in place of the glass substrate, a corona treatment was performed on the acrylic adhesive immediately before the PET film with an attached acrylic adhesive was laminated, and the PET film with an attached acrylic adhesive was then laminated with the acrylic adhesive surface facing toward the support base material. In the obtained laminate K, the support base material and the PET film with an attached acrylic adhesive adhered to the silicone resin layer without forming bubbles, and there was no distortion defect. In addition, in the laminate K, peel strength at the interface between the silicone resin layer and the layer of the support base material was larger than peel strength at the interface between the PET film with an attached acrylic adhesive and the silicone resin layer. In addition, as a result of measurement performed in the same manner as in Example 1, the SORI of the laminate K was 100 μm.

When the laminate K exhibiting SORI substantially the same as that of the glass laminate A is used, an electronic device can be manufactured with good yield in the same manner as when the glass laminate A is used.

When the laminate K was vacuum adsorbed by a spin coater, it could be adsorbed without any problem.

When five laminates K were washed with water by a washer with a pure water shower mechanism, film peeling occurred in four laminates.

The peeling test according to the aforementioned (Method for Measuring Peel Strength) was performed on the laminate K, and peel strength (N/25 mm) of the PET film with an attached acrylic adhesive was measured. The peel strength in this case was 1.09 N/25 mm.

While the present invention has been described in detail and with reference to specific embodiments thereof, it will be apparent to one skilled in the art that various changes and modifications can be made therein without departing from the spirit and scope of the present invention. The present application is based on a Japanese patent application filed on Aug. 18, 2016 (Application No. 2016-160802), the whole thereof being incorporated herein by reference. In addition, all the references cited herein are incorporated as a whole.

REFERENCE SIGNS LIST 10,100 GLASS LAMINATE
12 SUPPORT BASE MATERIAL
14 ADHESIVE LAYER
16 SUBSTRATE WITH ATTACHED DIELECTRIC MULTILAYER FILM
18,18A,28 GLASS SUBSTRATE
20,20A DIELECTRIC MULTILAYER FILM
22 SUPPORT BASE MATERIAL WITH ATTACHED ADHESIVE LAYER
24 MEMBER FOR ELECTRONIC DEVICE
30 LAMINATE WITH ATTACHED MEMBER FOR ELECTRONIC DEVICE
32 ELECTRONIC DEVICE

The invention claimed is:

1. A laminate comprising, in the order listed:
a support base material layer;
an adhesive layer on the support base material layer;
a dielectric multilayer inorganic film having a first outermost layer on and peelably adhered to the adhesive layer; and
a substrate on and directly adhered to a second outermost layer of the dielectric multilayer inorganic film opposite to the first outermost layer peelably adhered to the adhesive layer;
wherein:
the first outermost dielectric layer peelably adhered to the adhesive layer comprises Si atoms,
the substrate has a surface having an interior region and a peripheral region surrounding the interior region,
the dielectric multilayer inorganic film is disposed only on the interior region and is not disposed on the peripheral region,
and the dielectric multilayer inorganic film comprises two or more dielectric layers, each dielectric layer having a different refractive index from an adjacent dielectric layer.

2. The laminate according to claim 1, wherein the substrate before being disposed on the adhesive layer has an SORI of 130 μm or more.

3. The laminate according to claim 1, wherein the first outermost dielectric layer peelably adhered to the adhesive layer is $SiO_2$.

4. The laminate according to claim 1, wherein the dielectric multilayer inorganic film is an antireflection film.

5. The laminate according to claim 1, wherein the dielectric multilayer inorganic film has a thickness of 0.001 to 5 μm.

6. The laminate according to claim 1, wherein:
the peripheral region of the substrate has a width in a range of 0.1 mm to 20 mm.

7. The laminate according to claim 1, wherein:
the peripheral region of the substrate has a width in a range of 0.01 mm or less.

8. The laminate according to claim 1 wherein the first outermost dielectric layer is a deposited film of silicon oxide or a sputtered film of silicon oxide.

9. The laminate according to claim 1, wherein the adhesive layer comprises a silicone resin.

10. The laminate according to claim 1, wherein an area of a main surface of the substrate is 300 cm$^2$ or more.

11. The laminate according to claim 1, having a SORI of 20 μm to 120 μm.

12. The laminate according to claim 1, wherein the substrate is a glass substrate.

13. The laminate according to claim 2, wherein the first outermost dielectric layer is a deposited film of silicon oxide or a sputtered film of silicon oxide.

14. The laminate according to claim 2, having an SORI of 20 μm to 120 μm.

15. A method for manufacturing an electronic device, comprising:
forming a member for an electronic device on the surface of the substrate of the laminate according to claim 1 opposite to the adhesive layer to obtain a laminate with an attached member for an electronic device; and
removing the support base material and the adhesive layer from the laminate with the attached member for an electronic device to obtain an electronic device comprising the substrate with the attached dielectric multilayer inorganic film and the member for an electronic device.

16. The method for manufacturing an electronic device according 15, wherein the substrate is a glass substrate.

17. A method for manufacturing the laminate according to claim 1, comprising:
applying at least one surface treatment selected from the group consisting of a corona treatment, an atmospheric plasma treatment and a UV ozone treatment to the first outermost dielectric layer of the dielectric multilayer inorganic film; and
laminating the support base material with attached adhesive layer to the substrate with an attached dielectric multilayer inorganic film subjected to the surface treatment.

18. A method for manufacturing an electronic device, comprising:
forming a member for an electronic device on the surface of the substrate of the laminate according to claim 2 opposite to the adhesive layer to obtain a laminate with an attached member for an electronic device; and
removing the support base material and the adhesive layer from the laminate with the attached member for an electronic device to obtain an electronic device comprising the substrate with the attached dielectric multilayer inorganic film and the member for an electronic device.

* * * * *